(12) United States Patent
Fujii

(10) Patent No.: US 12,154,590 B2
(45) Date of Patent: *Nov. 26, 2024

(54) DATA PROCESSING METHOD, DATA PROCESSING DEVICE, AND PROGRAM

(71) Applicant: Panasonic Intellectual Property Management Co., Ltd., Osaka (JP)

(72) Inventor: Ryota Fujii, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,246

(22) Filed: Oct. 18, 2023

(65) Prior Publication Data
US 2024/0046953 A1 Feb. 8, 2024

Related U.S. Application Data

(63) Continuation of application No. 17/264,194, filed as application No. PCT/JP2019/028229 on Jul. 18, 2019, now Pat. No. 11,830,518.

(30) Foreign Application Priority Data

Jul. 31, 2018 (JP) .................................. 2018-144436
Jul. 31, 2018 (JP) .................................. 2018-144437

(51) Int. Cl.
*G10L 25/51* (2013.01)
*G06N 20/00* (2019.01)
*G10L 15/08* (2006.01)

(52) U.S. Cl.
CPC .............. *G10L 25/51* (2013.01); *G06N 20/00* (2019.01); *G10L 15/08* (2013.01)

(58) Field of Classification Search
CPC .......... G10L 25/51; G10L 15/08; G06N 20/00
See application file for complete search history.

(56) References Cited

U.S. PATENT DOCUMENTS

2015/0242754 A1* 8/2015 Fukuda .................. G06N 20/00
706/12
2019/0120719 A1* 4/2019 Koizumi ............. G01M 13/028

FOREIGN PATENT DOCUMENTS

JP           56-104246         8/1981
JP           2010-134367       6/2010
(Continued)

OTHER PUBLICATIONS

International Search Report issued in International Pat. Appl. No. PCT/JP2019/028229, dated Oct. 1, 2019, along with an English translation thereof.
(Continued)

*Primary Examiner* — Ibrahim Siddo
(74) *Attorney, Agent, or Firm* — GREENBLUM & BERNSTEIN, P.L.C.

(57) ABSTRACT

A sound data processing method of a sound data processing device, the sound data processing device including a processing unit configured to acquire sound data of a target by input and to process the sound data, the sound data processing method including: a step of generating, by using acquired normal sound data of the target, simulated abnormal sound data that becomes a simulated abnormal sound of the target; and a step of performing machine learning by using the acquired normal sound data and the generated simulated abnormal sound data as learning sound data, and generating a learning model for determining an abnormal sound of the sound data of the target to perform abnormal sound detection.

9 Claims, 17 Drawing Sheets

(56) References Cited

FOREIGN PATENT DOCUMENTS

| | | |
|---|---|---|
| JP | 2015-161745 | 9/2015 |
| JP | 2017-090606 | 5/2017 |
| WO | 2015/011791 | 1/2015 |
| WO | 2017/171051 | 10/2017 |

OTHER PUBLICATIONS

Written Opinion of the International Searching Authority issued in International Pat. Appl. No. PCT/JP/2019/028229, dated Oct. 1, 2019.

* cited by examiner

ABNORMAL SOUND

NORMAL SOUND

NORMAL SOUND

ABNORMAL SOUND

NORMAL SOUND

ABNORMAL SOUND

DATA PROCESSING METHOD, DATA PROCESSING DEVICE, AND PROGRAM

CROSS-REFERENCE TO RELATED APPLICATIONS

This is a continuation of U.S. patent application Ser. No. 17/264,194, filed Jan. 28, 2021, which is a National Stage Entry of Int. Pat. Appl. No. PCT/JP2019/028229, filed Jul. 18, 2019, which claims the benefit of Jap. Pat. Appl. No. 2018-144436, filed Jul. 31, 2018, and Jap. Pat. Appl. No. 2018-144437, filed Jul. 31, 2018. The disclosure of each of the above-mentioned documents, including the specification, drawings, and claims, is incorporated herein by reference in its entirety.

TECHNICAL FIELD

The present disclosure relates to a sound data processing method, a sound data processing device, and a program that perform a processing related to machine learning of target sound data.

BACKGROUND ART

In various facilities and the like, a system has been conventionally used in which a sound of a target object, a target space, or the like is collected, acquired sound data is analyzed to perform abnormality detection, monitoring of an operation situation of equipment, quality determination of a product, and the like. In this type of system, for example, there is a device that detects an abnormality in sound data of the target object and performs failure determination or the like when an abnormal sound is generated. Recently, in order to detect an abnormality in acquired sound data, various studies have been made to determine an abnormal sound by using a machine learning processing based on a statistical method.

For example, Patent Literature 1 discloses a device that detects an abnormal sound of a machine by using learning data of a given mechanical sound during a normal operation. The device of Patent Literature 1 separates an input signal in a frequency domain into two or more types of signals having different sound properties, extracts a predetermined acoustic feature amount for the two or more types of signals, calculates abnormality degrees of the two or more types of signals by using the extracted acoustic feature amount and a model of the two or more types of signals in a normal condition learned in advance, and determines whether the signal in the frequency domain is abnormal by using an integrated abnormality degree obtained by integrating these abnormality degrees.

CITATION LIST

Patent Literature

Patent Literature 1: JP-A-2017-090606

SUMMARY OF INVENTION

Technical Problem

When performing the machine learning, it is important to generate a more suitable learning model to improve accuracy of a determination result. In order to generate a suitable learning model, a large amount of data and data having appropriate features are required as learning data. However, it may be difficult to appropriately acquire a large amount of sound data and sound data having appropriate features as the learning data so as to adapt to classification determination such as abnormality detection of target sound data.

The present disclosure has been devised in view of the above-mentioned conventional situations, and an object of the present disclosure is to provide a sound data processing method, a sound data processing device, and a program that can generate a suitable learning model by using appropriate learning data when performing machine learning of sound data.

Solution to Problem

The present disclosure provides a sound data processing method of a sound data processing device, the sound data processing device including a processing unit configured to acquire sound data of a target by input and to process the sound data, the sound data processing method including: a step of generating, by using acquired normal sound data of the target, simulated abnormal sound data that becomes a simulated abnormal sound of the target; and a step of performing machine learning by using the acquired normal sound data and the generated simulated abnormal sound data as learning sound data, and generating a learning model for determining an abnormal sound of the sound data of the target to perform abnormal sound detection.

The present disclosure provides a sound data processing device including: a processing unit configured to acquire sound data of a target by input and to process the sound data, wherein the processing unit includes: a simulated abnormal sound generation unit configured to generate, by using acquired normal sound data of the target, simulated abnormal sound data that becomes a simulated abnormal sound of the target, and a machine learning unit configured to perform machine learning by using the acquired normal sound data and the generated simulated abnormal sound data as learning sound data, and generate a learning model for determining an abnormal sound of the sound data of the target to perform abnormal sound detection.

The present disclosure provides a program for causing a sound data processing device, which is a computer, to execute: a step of acquiring sound data of a target; a step of generating, by using acquired normal sound data of the target, simulated abnormal sound data that becomes a simulated abnormal sound of the target; and a step of performing machine learning by using the acquired normal sound data and the generated simulated abnormal sound data as learning sound data, and generating a learning model for determining an abnormal sound of the sound data of the target to perform abnormal sound detection.

The present disclosure provides a sound data processing method of a sound data processing device, the sound data processing device including a processing unit configured to acquire sound data of a target by input and to process the sound data, the sound data processing method including: a step of generating similar sound data that becomes a similar sound similar to the sound data of the target, based on acquired sound data of the target; and a step of performing machine learning by using the acquired sound data of the target and the generated similar sound data as learning sound data, and generating a learning model for performing classification determination related to the sound data of the target.

The present disclosure provides a sound data processing device including: a processing unit configured to acquire sound data of the target by input and to process the sound data, wherein the processing unit includes: a similar environment generation unit configured to generate similar sound data that becomes a similar sound similar to the sound data of the target, based on acquired sound data of the target, and a machine learning unit configured to perform machine learning by using the acquired sound data of the target and the generated similar sound data as learning sound data, and generate a learning model for performing classification determination related to the sound data of the target.

The present disclosure provides a program for causing a sound data processing device, which is a computer, to execute: a step of acquiring sound data of the target; a step of generating similar sound data that becomes a similar sound similar to the sound data of the target, based on acquired sound data of the target; and a step of performing machine learning by using the acquired sound data of the target and the generated similar sound data as learning sound data, and generating a learning model for performing classification determination related to the sound data of the target.

Advantageous Effects of Invention

According to the present disclosure, it is possible to generate a suitable learning model by using appropriate learning data when performing machine learning of sound data.

DESCRIPTION OF EMBODIMENTS

Figure 1:
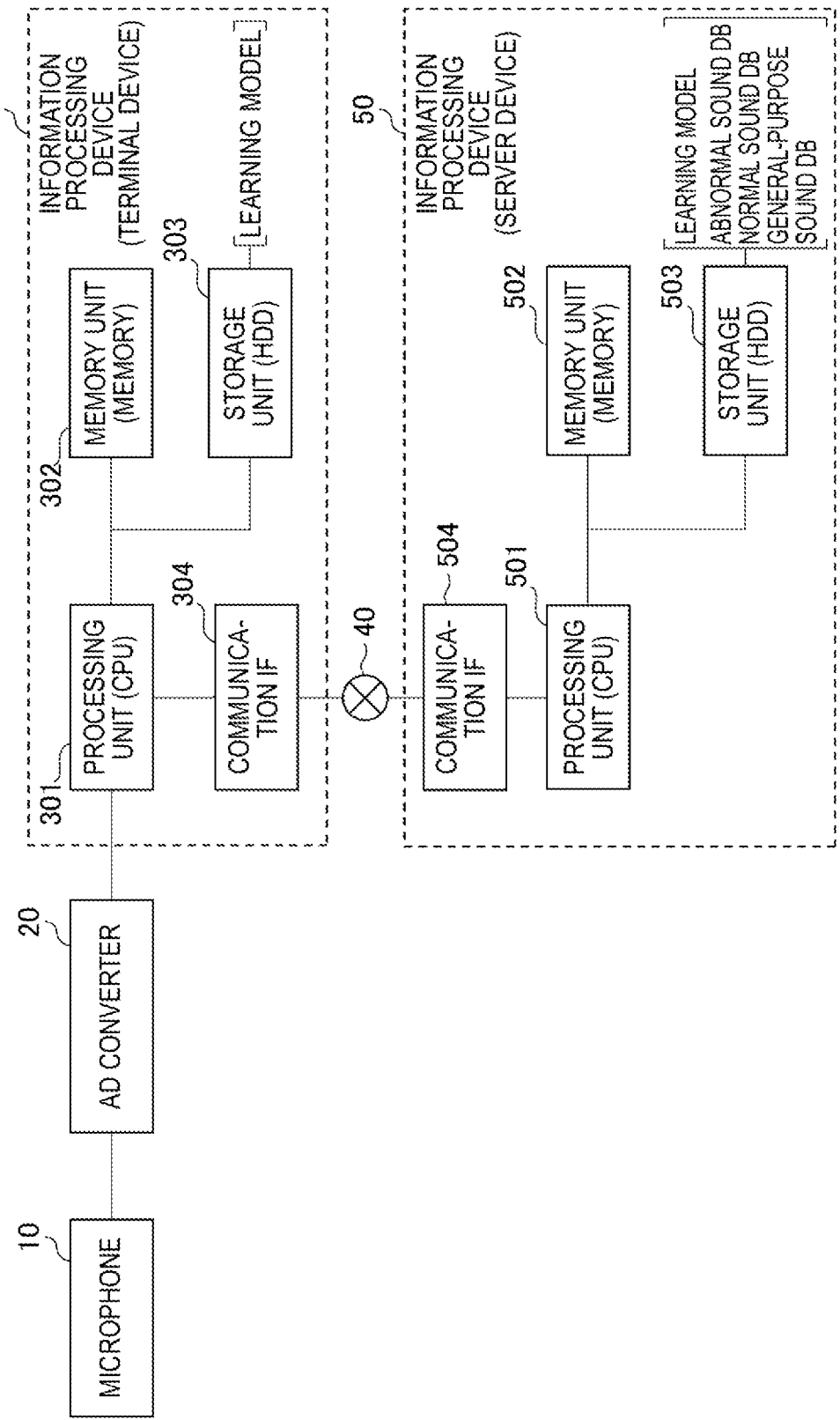
FIG. 1 is a block diagram showing an example of a configuration of a sound data processing device according to the present embodiment.

Hereinafter, each embodiment in which a configuration according to the present disclosure is specifically disclosed will be described in detail with reference to the drawings as appropriate. However, unnecessarily detailed description may be omitted. For example, detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Introduction to Present Embodiment

When machine learning of sound data is performed, learning data may not be sufficiently acquired. The machine learning generally requires a large amount of data for learning. Particularly, deep learning technique requires a large amount of data (tens of thousands to millions) in order to utilize a depth of a hierarchy thereof. However, there is a case where the learning data cannot be easily acquired depending on a use scene. Particularly, the sound data has less sample data acquired as existing data than image data, and there is no environment in which the learning data is searched and collected using the Internet, such as hammering sound of an equipment inspection. For example, when the machine learning of the sound data such as an operation sound of a machine and a hammering sound of an equipment inspection is performed, there is a problem that a sufficient amount of learning data cannot be acquired.

Data augmentation is a method of effectively using limited learning data in order to acquire a large amount of learning data. Data augmentation is a method of adding noise to existing learning data, or in a case of an image, of performing a processing such as inversion or rotation to provide a variation. However, augmentation similar to that of the image data cannot be easily applied to the sound data. For example, it is conceivable that a short time fourier transform (STFT) processing is performed on a voice waveform to convert the voice waveform into a spectrogram image, and a data processing is performed in the same way as that of the image, but accuracy of data deteriorates and appropriate learning may not be performed. That is, in the machine learning of the sound data, it is necessary to perform augmentation of the learning data after capturing features of a voice.

In a use case using the machine learning of the sound data, sound data of a target sound may hardly be acquired. For example, in a case of the operation sound of the machine, data can always be collected if a normal sound is recorded during an operation, but an abnormal sound cannot be acquired unless the abnormal sound is recorded when an abnormality occurs. In such a situation where it is difficult to acquire an abnormal sound, when detecting the abnormal sound by using the machine learning, it is necessary to construct a system that detects an abnormality by only using learning data of a normal sound.

As a method of detecting an abnormality using only the learning data of the normal sound, there is a method of detecting an abnormality by calculating a difference between a learned value and an evaluation value and evaluating whether a difference value is larger than a predetermined threshold, that is, a degree of deviation from a normal value, as described in Patent Literature 1 and the like described above. However, in this method, what can be detected as an abnormal sound is a sound that is significantly different from the normal value. For example, in a use case where a sound is abnormal although a difference is small from a normal sound, it is difficult to detect the abnormal sound.

In view of the background described above, in the present embodiment, an example of a system in which a large amount of sound data and sound data having appropriate features can be used as learning data, a learning model suitable for performing machine learning of sound data can be generated, and an appropriate evaluation can be performed during an operation will be shown below.

In the present embodiment, as a configuration example of a system that performs a processing of target sound data, an example of a sound data processing device and a sound data processing method that perform machine learning using acquired sound data to generate a learning model and perform abnormality determination as classification determination of sound data by using the generated learning model will be shown. Here, as an example of the target sound data, a case where a mechanical sound of a fan, a motor, or the like of equipment such as a data center or a factory is assumed, and the abnormal sound detection is performed by determining an abnormal sound of sound data will be exemplified.

(Configuration of Sound Data Processing Device)

FIG. 1 is a block diagram showing an example of a configuration of a sound data processing device according to the present embodiment. The sound data processing device includes one or more microphones 10, an AD converter 20, and information processing devices 30 and 50. The information processing devices 30 and 50 are configured with, for example, a computer such as a personal computer (PC) including a processor and a memory, and execute various information processings related to machine learning and the like according to the present embodiment.

The microphone 10 includes a sound collection device such as a condenser microphone that receives, as an input, sound waves generated in a target object, a target space, or the like to output the sound waves as an audio signal of an electrical signal. The AD converter 20 converts an analog audio signal into digital sound data by using a predetermined quantization bit and a sampling frequency.

The information processing device 30 is connected to the AD converter 20, and receives, as an input, target sound data collected by the microphones 10 and converted into digital data by the AD converter 20. The information processing device 30 is connected to the information processing device 50 via a communication path 40 such as a wired or wireless network or a communication line. In an illustrated example, the information processing device 30 functions as a terminal device of a local computer disposed at a site, the information processing device 50 functions as a server device of a remote computer disposed at another place, and a processing according to the present embodiment is distributed and executed by a plurality of information processing devices. The information processing device 50 may be a cloud computer on a network. The information processing device 30 mainly functions as a detection device that executes an abnormal sound detection processing during an operation using a learning model based on the machine learning. The information processing device 50 mainly functions as a learning device that executes a machine learning processing during learning to generate the learning model by performing the machine learning. The information processing devices 30 and 50 may be configured to execute a processing by a device such as one computer or may be configured to execute the processing by devices such as three or more computers, and are not limited to physical device configurations.

The information processing device 30 includes a processing unit 301, a memory unit 302, a storage unit 303, and a communication interface (a communication IF) 304. The processing unit 301 includes various processing devices such as a central processing unit (CPU), a digital signal processor (DSP), and a field programmable gate array (FPGA), and executes a processing related to the sound data. The memory unit 302 includes a memory device such as a random access memory (RAM), is used as a working memory of the processing unit 301, and is used for temporary memory in calculation or the like during data processing. Further, the memory unit 302 includes a memory device such as a read only memory (ROM), and memorizes various execution programs for executing a processing of the processing unit 301 and various setting data related to a processing such as the machine learning. The storage unit 303 includes various storage devices such as a hard disk drive (HDD), a solid state drive (SSD), and an optical disk drive, and stores the target sound data and data such as the learning model generated by the machine learning. The communication interface 304 is an interface that performs wired or wireless communication, communicates with the information processing device 50 via the communication path 40, and transmits and receives data such as the sound data and the learning model.

The information processing device 50 includes a processing unit 501, a memory unit 502, a storage unit 503, and a communication interface (a communication IF) 504. The processing unit 501 includes various processing devices such as a CPU, a DSP, and an FPGA, and executes a processing related to the sound data. The memory unit 502 includes a memory device such as a RAM, is used as a working memory of the processing unit 501, and is used for temporary memory in calculation or the like during data processing. Further, the memory unit 502 includes a memory device such as a ROM, and memorizes various execution programs for executing a processing of the processing unit 501 and various pieces of setting data related to a processing such as the machine learning. The storage unit 503 includes various storage devices such as an HDD, an SSD, and an optical disk drive, and stores data such as the target sound data, the learning model generated by the machine learning, an abnormal sound database (abnormal sound DB), a normal sound database (normal sound DB), and a general-purpose sound database (general-purpose sound DB). The abnormal sound database is a database in which sound data in an abnormal state is collected. The normal sound database is a database in which sound data in a normal state is collected. The general-purpose sound database is a database in which various pieces of general-purpose sound data generated on a daily basis are collected. The communication interface 504 is an interface that performs wired or wireless communication, communicates with the information processing device 30 via the communication path 40, and transmits and receives data such as the sound data and the learning model.

In the present embodiment, the target sound data collected by the microphones 10 is acquired, and a processing of the sound data is executed by the information processing devices 30 and 50. During learning, machine learning of the sound data is executed by the information processing devices 30 and 50 and a learning model is generated. During an operation, the information processing devices 30 and 50 use the learning model to determine an abnormality in the sound data and detect an abnormal sound.

Hereinafter, some embodiments of the sound data processing method and the device for executing the processing including the machine learning of the sound data according to the present embodiment will be exemplified.

First Embodiment

In a first embodiment, an example is shown in which a similar environment of the acquired sound data is created, so that similar sounds of the target sound data are generated to perform augmentation of learning data, and the sound data is learned and evaluated.

Figure 2:
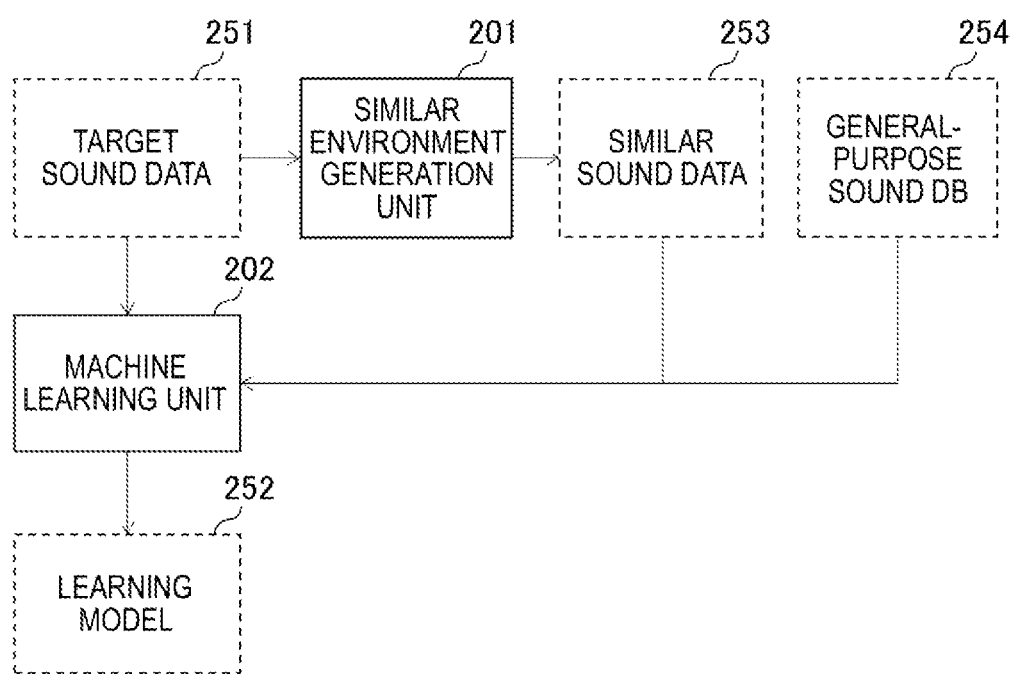
FIG. 2 is a block diagram showing a functional configuration during learning of the sound data processing device according to a first embodiment.

FIG. 2 is a block diagram showing a functional configuration during learning of the sound data processing device according to the first embodiment. The sound data processing device has functions of a similar environment generation unit 201 and a machine learning unit 202 during learning of the machine learning. The similar environment generation unit 201 and the machine learning unit 202 implement functions of the units by processings of the processing units 301 and 501 of the information processing devices 30 and 50.

The similar environment generation unit 201 generates a similar environment of sound data of a learning target acquired in a real environment, and automatically generates similar sound data 253 that is sound data of similar sounds by using target sound data 251 acquired as the target sound data, so that augmentation of the learning data is performed. The machine learning unit 202 executes the machine learning such as deep learning by using artificial intelligence (Ai) mounted on the processing units. The machine learning unit 202 uses the acquired target sound data 251, the similar sound data 253 generated based on the target sound data 251, and a general-purpose sound database (general-purpose sound DB) 254 to perform the machine learning processing and generate a learning model 252 as a learning result. The general-purpose sound database 254 accumulates general-purpose sound data including various general-purpose daily sounds such as an environmental sound and a human voice.

The machine learning processing of the machine learning unit 202 may be performed using one or more statistical classification techniques. Examples of the statistical classification techniques include linear classifiers, support vector machines, quadratic classifiers, kernel estimation, decision trees, artificial neural networks. Bayesian techniques and/or networks, hidden Markov models, binary classifiers, multi-class classifiers, a clustering technique, a random forest technique, a logistic regression technique, a linear regression technique, and a gradient boosting technique. However, the statistical classification techniques to be used are not limited thereto.

Figure 3:
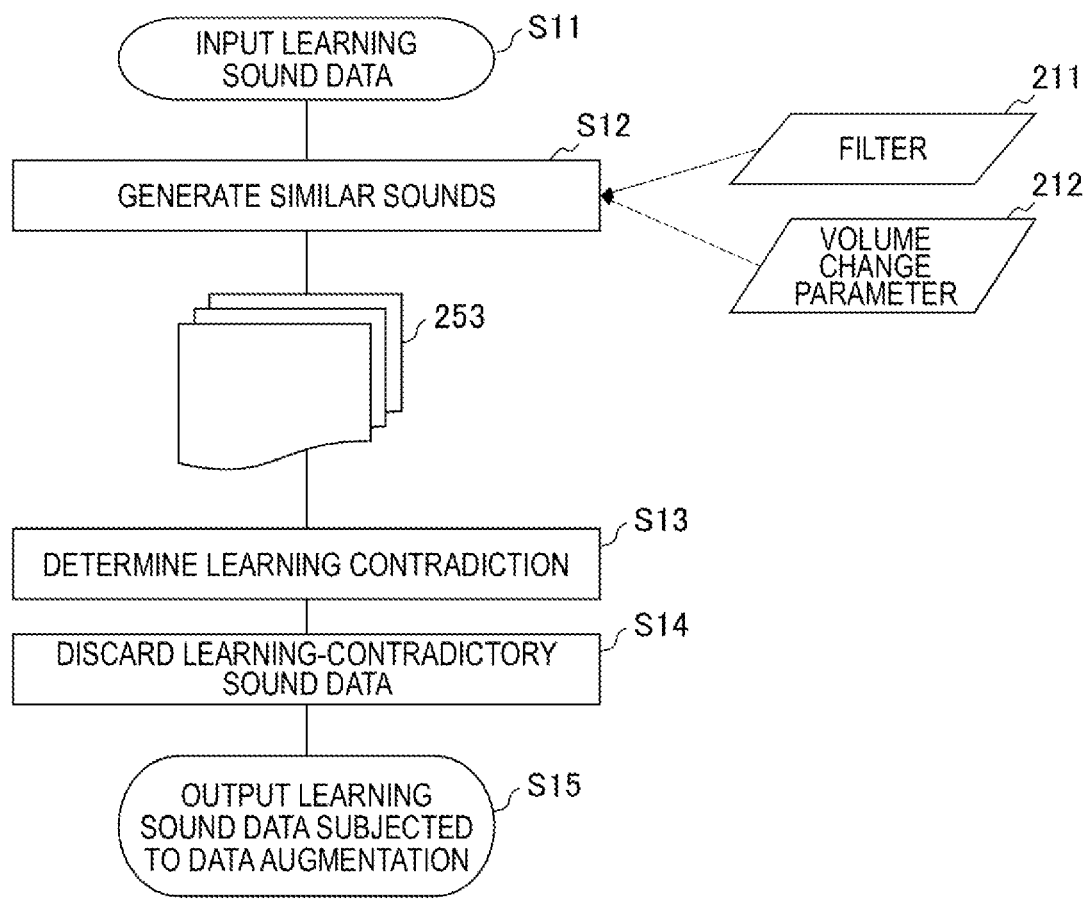
FIG. 3 is a flowchart showing a processing of a similar environment generation unit according to the first embodiment.

FIG. 3 is a flowchart showing a processing of the similar environment generation unit 201 according to the first embodiment. The similar environment generation unit 201 receives, as an input, the target sound data 251 acquired by the microphones 10 or the like as learning sound data (S11), performs a generation processing of similar sounds related to the target sound data 251 (S12), and generates the similar sound data 253. At this time, the similar environment generation unit 201 uses a filter 211, a volume change parameter 212, and the like to change a frequency characteristic, a volume, sound quality, and the like of the sound data to generate a plurality of pieces of sound data similar to the original sound data. That is, the similar environment generation unit 201 generates the similar sound data 253 by changing at least one of a frequency characteristic and a volume of the target sound data 251.

The filter 211 is a filter that changes the frequency characteristic of the sound data, such as a low-pass filter (LPF) or a high-pass filter (HPF). The volume change parameter 212 is a parameter for changing the volume of the sound data, such as a volume of an entire frequency band of the sound data or a volume of a predetermined frequency band of the sound data for emphasizing or reducing a specific frequency, or the like. The similar environment generation unit 201 creates various variations related to the original sound data and automatically generates a plurality of pieces of similar sound data 253 by the above-described processing. In the similar environment generation unit 201, it is also possible to have means for performing augmentation of the learning data by a plurality of different approaches, select appropriate augmentation means in accordance with a pattern of the target sound data, and additionally generate learning sound data.

Next, the similar environment generation unit 201 determines whether a learning contradiction occurs in the generated similar sound data 253 (S13). In the determination of the learning contradiction, for example, a matching degree of frequencies of the plurality of pieces of generated sound data is determined, and when there is a fact that labels of the learning sound data are different but frequencies match, it is determined that the learning contradiction occurs. Subsequently, the similar environment generation unit 201 discards learning-contradictory sound data (S14). Accordingly, sound data having a different label and the same frequency is removed from the generated similar sound data 253, and the learning contradiction of the learning sound data is eliminated. In this way, the similar environment generation unit 201 generates the similar sound data 253 to add the generated similar sound data 253 to the target sound data 251, so that appropriate augmentation of learning sound data corresponding to features of the target sound data 251 is performed. Then, the similar environment generation unit 201 outputs the learning sound data subjected to data augmentation (S15).

The machine learning unit 202 generates the learning model 252 by performing the machine learning processing by using the learning sound data that is subjected to the data augmentation and that includes the target sound data 251 and the similar sound data 253.

Figure 4:
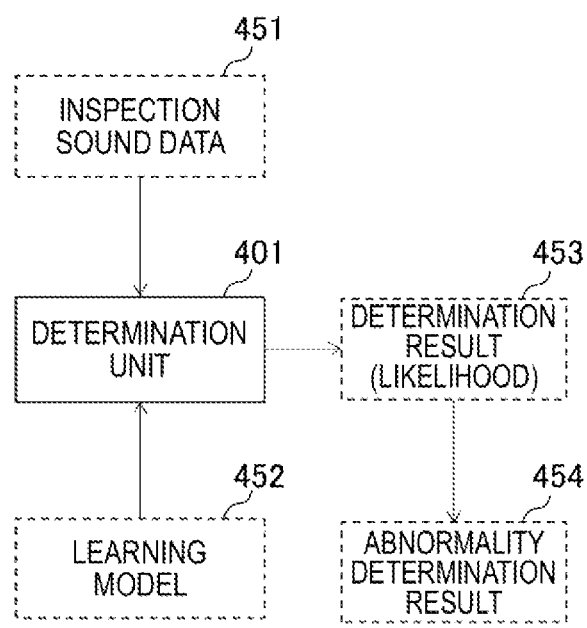
FIG. 4 is a block diagram showing a functional configuration during an operation of the sound data processing device according to the present embodiment.

FIG. 4 is a block diagram showing a functional configuration during an operation of the sound data processing device according to the present embodiment. The sound data processing device has a function of a determination unit 401 during an operation using the learning model based on the machine learning. The determination unit 401 implements functions of the units by the processings of the processing units 301 and 501 of the information processing devices 30 and 50. The function of the determination unit 401 can use a processing during an operation using a learning model based on general machine learning.

The determination unit 401 receives, as an input, inspection sound data 451 that is sound data of an inspection target, determines normality or abnormality of sound data by likelihood or the like by using a learning model 452 generated by the machine learning, and outputs a determination result 453. The learning model 452 is a result of learning for the learning sound data as different labeling (clustering) for the normality and the abnormality. Therefore, the determination unit 401 calculates normal likelihood and abnormal likelihood for the inspection sound data 451 of a determination target, and determines whether the inspection sound data 451 is close to the normality or the abnormality. Then, the determination unit 401 outputs an abnormality determination result 454 indicating whether the target sound data is abnormal, based on the determination result 453 of the inspection sound data 451. Abnormal sound detection of the target sound is executed based on the abnormality determination result 454.

Figure 5A:
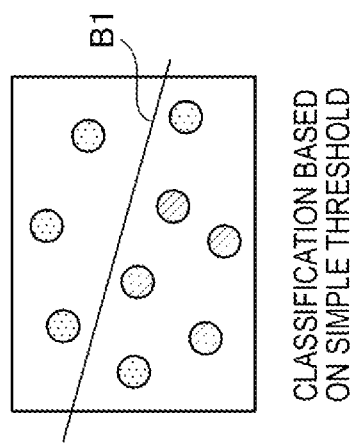
FIGS. 5A and 5B are diagrams conceptually illustrating an abnormality determination processing of sound data using machine learning.
Figure 5B:
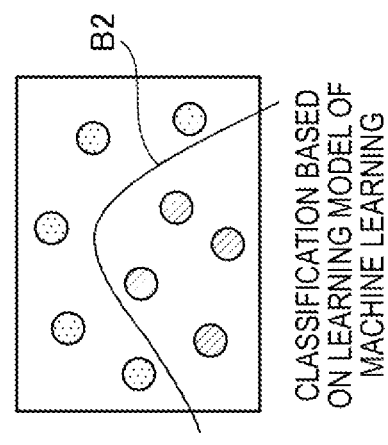

FIGS. 5A and 5B are diagrams conceptually illustrating an abnormality determination processing of sound data using the machine learning. FIG. 5A shows an example of classification of sound data based on a simple threshold, and FIG. 5B shows an example of classification of sound data based on a learning model using the machine learning. In FIGS. 5A and 5B, the classification of data is simply shown in a two-dimensional space in order to make the description easy to understand. Sound data of each inspection sound is indicated by a circular mark, dot hatching represents a normal sound, and oblique hatching represents an abnormal sound.

As shown in FIG. 5A, in classification by a linear boundary B1 using the simple threshold, normal sounds may be erroneously classified as abnormal sounds. On the contrary, as shown in FIG. 5B, in classification by a boundary B2 based on the learning model of the machine learning using a neural network, normal sounds and abnormal sounds can be accurately classified, and a more probable determination result can be acquired.

Figure 6A:
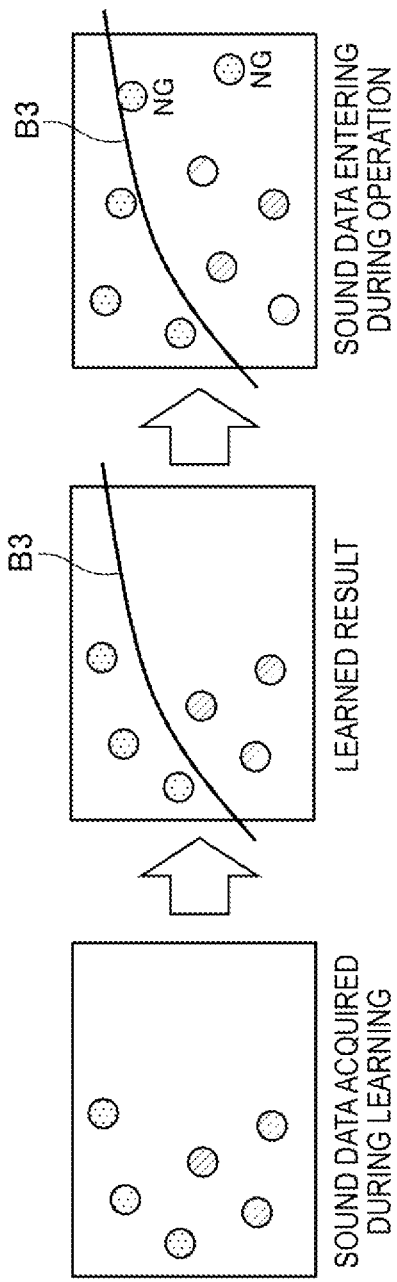
FIGS. 6A and 6B are diagrams conceptually illustrating an abnormality determination processing of sound data according to the first embodiment.
Figure 6B:
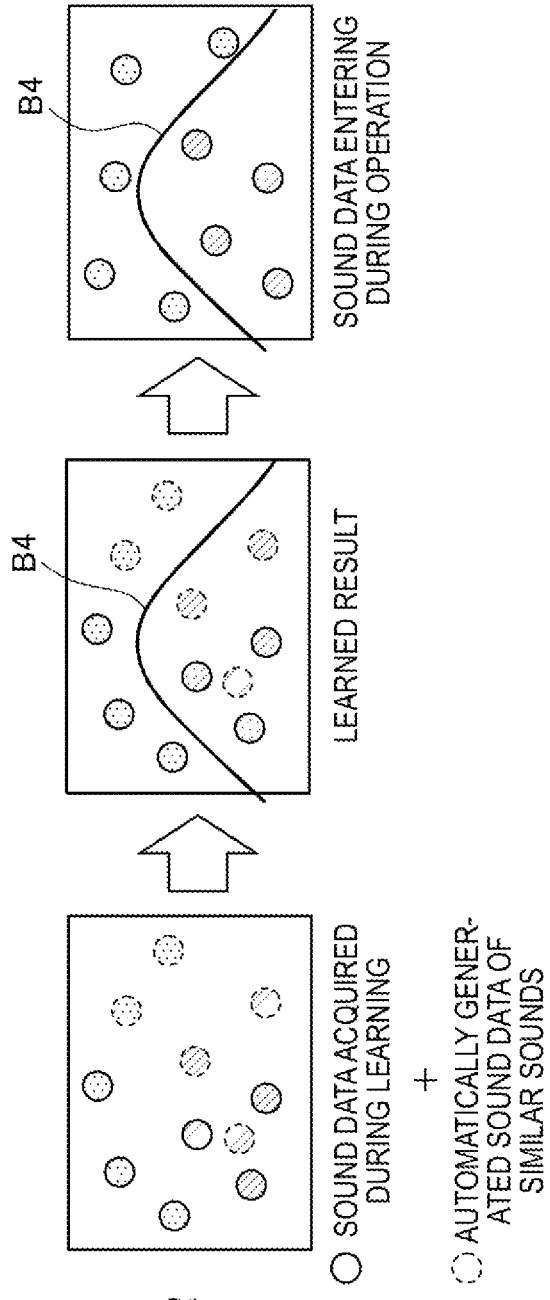

FIGS. 6A and 6B are diagrams conceptually illustrating an abnormality determination processing of sound data according to the first embodiment. FIG. 6A shows, as a comparative example, an example of classification of sound data based on a learning model in which data augmentation is not performed, and FIG. 6B shows an example of classification of sound data based on a learning model in which the data augmentation is performed by generating similar sounds as in the first embodiment. In FIGS. 6A and 6B, the classification of data is simply shown in a two-dimensional space in order to make the description easy to understand. Sound data of each inspection sound is indicated by a circular mark, dot hatching represents a normal sound, and oblique hatching represents an abnormal sound. Further, circular marks in broken lines represent sound data of normal sounds and abnormal sounds added by the data augmentation.

As shown in FIG. 6A, in the learning model obtained as a result of performing machine learning by using only sound data acquired during learning, a boundary B3 may not be appropriately determined because there are a few variations of data. In this case, in sound data acquired during an operation, normal sounds are erroneously determined as abnormal sounds, and errors (NGs) occur in a determination result. Particularly, when there is bias in distribution of features of the sound data during learning, features of the sound data during an operation slightly deviate from the sound data during learning due to an environmental change, or the like, erroneous determination is likely to occur. On the contrary, as shown in FIG. 6B, sound data of similar sounds automatically generated is added to the sound data acquired during learning to perform augmentation of the learning data, and in a learning model obtained as a result of performing the machine learning, a more appropriate boundary B4 is determined based on a large amount of learning data. In this case, normal sounds and abnormal sounds can be accurately classified for the sound data acquired during the operation, and a more probable determination result can be acquired. Therefore, the abnormal sound detection can be executed with high accuracy.

As described above, in the present embodiment, similar sound data corresponding to sound data of a similar environment is automatically generated based on target sound data acquired in a real environment, so that augmentation of the learning data is performed. Accordingly, even when a large amount of learning data cannot be acquired in sound data in which appropriate augmentation of the learning data is not enabled by a data processing similar to that of an image, it is possible to generate a suitable learning model for the machine learning by using a sufficient amount of appropriate learning data. Further, by generating a similar environment of the sound data of the real environment acquired during learning, it is also possible to cope with a case where an environmental change occurs during an operation, and it is possible to generate a learning model that can acquire a determination result with high accuracy even when an environment changes. Accordingly, it is possible to improve accuracy of classification determination such as an abnormality determination result of the sound data using the learning model based on the machine learning.

Second Embodiment

A second embodiment shows an example in which when only normal sounds are acquired as learning data, simulated abnormal sounds are generated using an abnormal sound database, so that sound data of abnormal sounds is created as target learning data to perform augmentation of the learning data and learn and evaluate the sound data.

Figure 7:
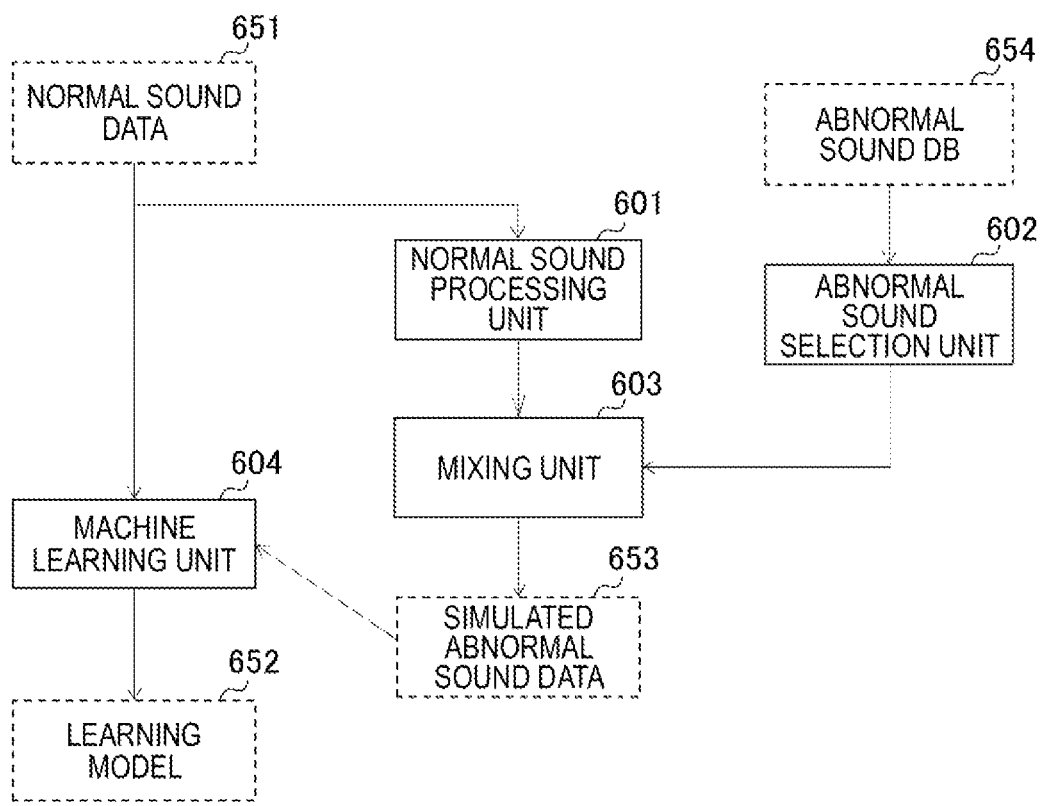
FIG. 7 is a block diagram showing a functional configuration during learning of a sound data processing device according to a second embodiment.

FIG. 7 is a block diagram showing a functional configuration during learning of a sound data processing device according to the second embodiment. The sound data processing device has functions of a normal sound processing unit 601, an abnormal sound selection unit 602, a mixing unit 603, and a machine learning unit 604 during machine learning. Here, the normal sound processing unit 601, the abnormal sound selection unit 602, and the mixing unit 603 implement a function as a simulated abnormal sound generation unit that generates simulated abnormal sound data 653. The normal sound processing unit 601, the abnormal sound selection unit 602, the mixing unit 603, and the machine learning unit 604 implement functions of the units by processings of the processing units 301 and 501 of the information processing devices 30 and 50.

The normal sound processing unit 601 uses the normal sound data 651 acquired as sound data of a learning target to perform a data processing for generating a simulated abnormal sound. The abnormal sound selection unit 602 uses an abnormal sound database (abnormal sound DB) 654 to select appropriate abnormal sound data in accordance with a type and features of the target sound data. The abnormal sound database 654 accumulates sound data corresponding to various abnormal sounds as sound data when an abnormality occurs. For example, in a case of a motor sound, a sound of changing a rotation speed, a sound of rubbing members, and the like are collected and stored in advance. The abnormal sound database 654 may store sound data representing an abnormal state suitable for an inspection target.

The mixing unit 603 performs a mixing processing of the processed normal sound data and selected abnormal sound data, and generates the simulated abnormal sound data 653 that is sound data of simulated abnormal sounds, so that augmentation of the learning data is performed. The machine learning unit 604 executes machine learning such as deep learning by using artificial intelligence mounted on the processing units. The machine learning unit 604 performs a machine learning processing by using the acquired normal sound data 651 and the simulated abnormal sound data 653 generated based on the normal sound data 651, and generates a learning model 652 as a learning result.

A machine learning processing of the machine learning unit 604 may be performed using one or more statistical classification techniques. Examples of the statistical classification techniques include linear classifiers, support vector machines, quadratic classifiers, kernel estimation, decision trees, artificial neural networks, Bayesian techniques and/or networks, hidden Markov models, binary classifiers, multi-class classifiers, a clustering technique, a random forest technique, a logistic regression technique, a linear regression technique, and a gradient boosting technique. However, the statistical classification techniques to be used are not limited thereto.

Figure 8:
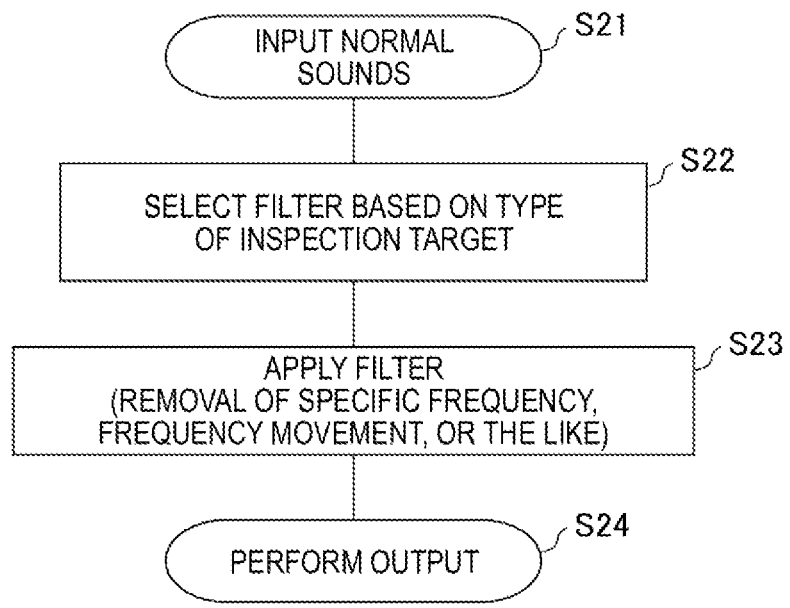
FIG. 8 is a flowchart showing a processing of a normal sound processing unit according to the second embodiment.

FIG. 8 is a flowchart showing a processing of the normal sound processing unit 601 according to the second embodiment. The normal sound processing unit 601 receives, as an input, the normal sound data 651 acquired by the microphones 10 or the like as sound data of normal sounds for learning (S21), and performs a data processing of sound data for performing a processing for mixing abnormal sounds. At this time, the normal sound processing unit 601 selects a filter that changes a frequency characteristic, such as a low-pass filter (LPF) or a high-pass filter (HPF), based on a type of sound data of an inspection target (S22). Then, the normal sound processing unit 601 applies the selected filter and processes the sound data by, for example, a processing such as removal of a specific frequency, or a frequency movement (S23). Here, the sound data processing device assumes a state where the inspection target is known in advance, and performs a processing in accordance with characteristics of the sound data of the inspection target. For example, a processing such as reducing and removing a specific frequency from a target sound of a steady sound, and pitch-converting a target sound having a peak frequency of 100 Hz and shifting the peak frequency to 200 Hz is executed. Further, a volume of sound data of a target sound may be adjusted in accordance with features of the sound data of the inspection target. Then, the normal sound processing unit 601 outputs sound data of normal sounds after the processing (S24).

In order to create an assumed simulated abnormal sound, there are various generation methods such as generating an abnormal sound by adding the abnormal sound to a normal sound, generating an abnormal sound by subtracting the abnormal sound from a normal sound, and generating an abnormal sound by changing characteristics of a part of a normal sound. Therefore, in order to generate a target abnormal sound in accordance with an environment of a normal sound, the normal sound processing unit 601 performs a processing such as processing the normal sound for mixing with the abnormal sound, processing the normal sound to make the abnormal sound, and the like. For example, a part of a frequency of the normal sound is reduced in order to add the abnormal sound. Alternatively, a frequency characteristic of the normal sound is changed in order to subtract the abnormal sound. Alternatively, when an abnormal state is a state where a sound is slightly higher than the sound in a normal state, the frequency of the normal sound is shifted slightly higher. Further, in a hammering sound of an equipment inspection, when a reverberation sound is in a normal state and a non-reverberation sound is in an abnormal state, a filter processing is performed so as to cancel out a component of the reverberation sound from the normal sound. A preprocessing for generating an abnormal sound is executed by these various data processings.

Figure 9:
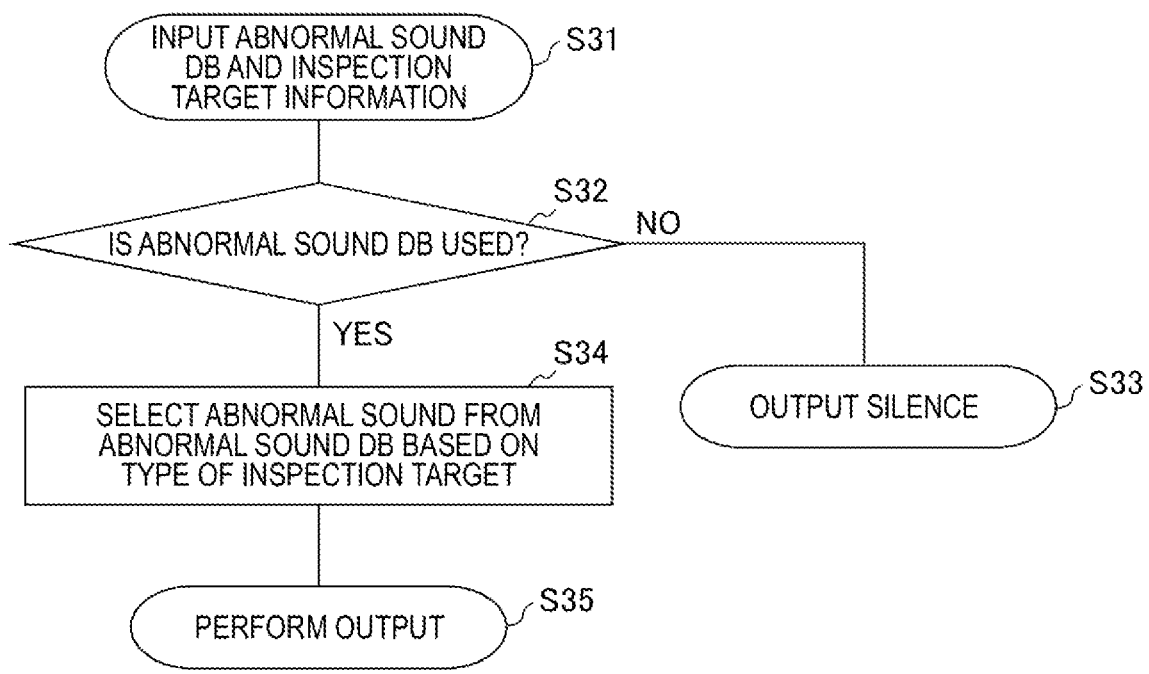
FIG. 9 is a flowchart showing a processing of an abnormal sound selection unit according to the second embodiment.

FIG. 9 is a flowchart showing a processing of the abnormal sound selection unit 602 according to the second embodiment. The abnormal sound selection unit 602 receives, as an input, list information of the abnormal sound database 654 and inspection target information related to a type and the like of the inspection target (S31). Then, the abnormal sound selection unit 602 determines whether to use the abnormal sound database 654 in accordance with characteristics of sound data of the inspection target, that is, whether to mix abnormal sounds by using sound data of the abnormal sound database 654, or whether to correspond to the characteristics of the sound data of the inspection target only by processing normal sounds (S32). Here, when the abnormal sound database 654 is not used, the abnormal sound selection unit 602 outputs silent sound data (S33). On the other hand, when the abnormal sound database 654 is used, the abnormal sound selection unit 602 selects sound data of an abnormal sound suitable for mixing from the abnormal sound database 654 based on the type of the sound data of the inspection target (S34). Then, the abnormal sound selection unit 602 outputs the selected sound data of the abnormal sound (S35).

Figure 10:
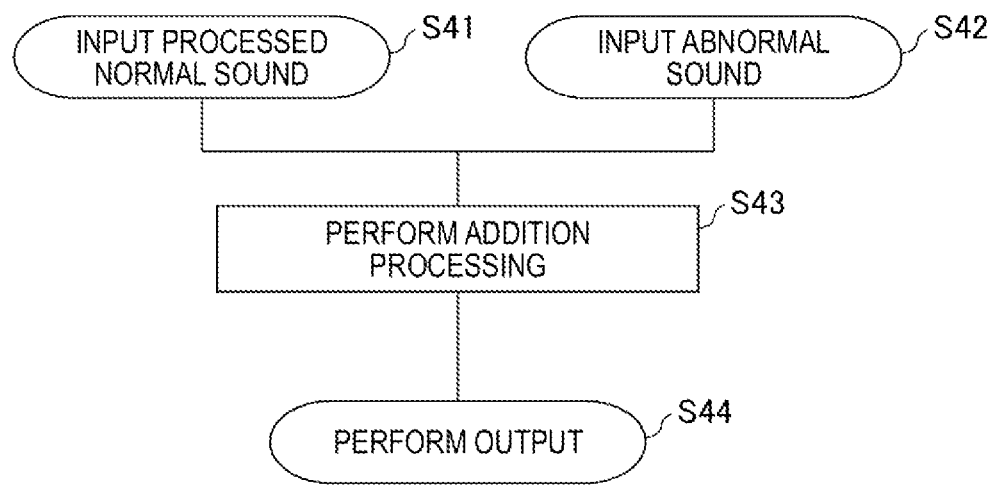
FIG. 10 is a flowchart showing a processing of a mixing unit according to the second embodiment.

FIG. 10 is a flowchart showing a processing of the mixing unit 603 according to the second embodiment. The mixing unit 603 receives, as an input, sound data of a normal sound processed by the normal sound processing unit 601 as sound data for mixing (S41), and receives, as an input, sound data of an abnormal sound selected by the abnormal sound selection unit 602 as the sound data for mixing (S42). Then, the mixing unit 603 mixes the sound data by performing an addition processing (a superimposition processing) of the processed normal sound and the abnormal sound (S43). Accordingly, sound data of a simulated abnormal sound is generated. At this time, as the addition processing, the mixing unit 603 executes a processing such as multiplying waveforms of the normal sound and the abnormal sound, adding the processed normal sound and the abnormal sound, subtracting the abnormal sound from the processed normal sound, making the abnormal sound silent without using the abnormal sound and using the processed normal sound as it is as the abnormal sound. Then, the mixing unit 603 outputs the generated sound data of the simulated abnormal sound (S44). In this way, the mixing unit 603 generates and adds the simulated abnormal sound data 653 by superimposing abnormal sound data from the abnormal sound database 654 on the normal sound data 651, so that appropriate augmentation of the learning sound data in accordance with features of the target sound data is performed. The mixing unit 603 may perform volume adjustment of a plurality of patterns in the addition processing, generate a plurality of different pieces of simulated abnormal sound data, and give a variation to the learning data.

The machine learning unit 604 performs the machine learning processing to generate the learning model 652 by using the learning sound data that is subjected to the data augmentation and that includes the target normal sound data 651 and the simulated abnormal sound data 653.

A functional configuration of the sound data processing device during an operation is the same as that of the first embodiment shown in FIG. 4. The sound data processing device has a function of a determination unit 401 during an operation using the learning model based on the machine learning. The determination unit 401 receives, as an input, the inspection sound data 451 that is sound data of the inspection target, determines normality or abnormality of sound data by likelihood or the like by using the learning model 452 generated by the machine learning, and outputs the determination result 453. Then, the determination unit 401 outputs the abnormality determination result 454 indicating whether the target sound data is abnormal, based on the determination result 453 of the inspection sound data 451. Abnormal sound detection of the target sound is executed based on the abnormality determination result 454.

Figure 11:
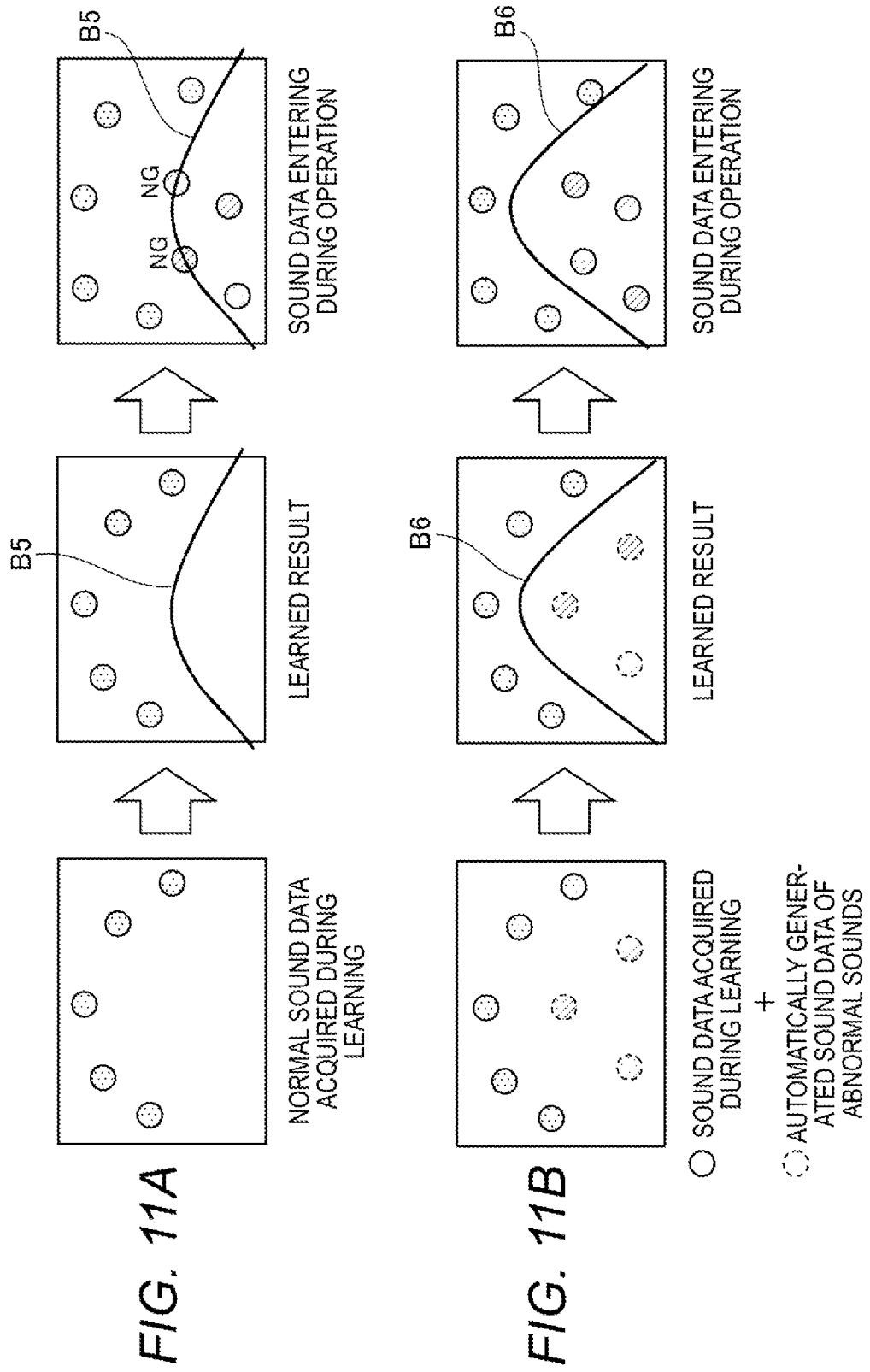
FIGS. 11A and 11B are diagrams conceptually illustrating an abnormality determination processing of sound data according to the second embodiment.

FIGS. 11A and 11B are diagrams conceptually illustrating an abnormality determination processing of the sound data according to the second embodiment. FIG. 11A shows, as a comparative example, an example of classification of sound data based on a learning model in which data augmentation is not performed, and FIG. 11B shows an example of classification of sound data based on a learning model in which the data augmentation is performed by generation of simulated abnormal sounds as in the second embodiment. In FIGS. 11A and 11B, the classification of data is simply shown in a two-dimensional space in order to make the description easy to understand. Sound data of each inspection sound is indicated by a circular mark, dot hatching represents a normal sound, and oblique hatching represents an abnormal sound. Further, a circular mark in a broken line represents sound data of an abnormal sound added by the data augmentation.

As shown in FIG. 11A, in the learning model obtained as a result of performing machine learning by using only sound data of normal sounds acquired during learning, since there is no learning result of an abnormal sound, how a determination standard is determined is uncertain, and a boundary B5 may not be appropriately determined. In this case, in sound data acquired during an operation, abnormal sounds are erroneously determined as normal sounds, and errors (NGs) occur in a determination result. Particularly, when an abnormal sound close to features of a normal sound occurs, it is difficult to determine an appropriate determination standard by learning only the normal sounds, and erroneous determination is likely to occur. On the contrary, as shown in FIG. 11B, sound data of simulated abnormal sounds automatically generated is added to the sound data acquired during learning to perform augmentation of learning data, and in the learning model obtained as a result of performing the machine learning, a more appropriate boundary B6 is determined in consideration of features of abnormal sounds. In this case, the normal sounds and the abnormal sounds can be accurately classified for the sound data acquired during the operation, and a more probable determination result can be acquired. Therefore, the abnormal sound detection can be executed with high accuracy.

As described above, in the present embodiment, the simulated abnormal sound data corresponding to the simulated abnormal sounds is automatically generated based on the sound data of a target in a normal condition acquired in a real environment, so that augmentation of learning data is performed. Accordingly, even when actual learning data at the time of an abnormality cannot be acquired, an abnormal sound can be simulatively learned together with a normal sound, and a suitable learning model for the machine learning can be generated using a sufficient amount of appropriate learning data. Further, by the machine learning using the simulated abnormal sound data, for example, even in a use case where a difference in features between a normal sound and an abnormal sound is small, it is possible to perform abnormality determination based on the subtle difference, and it is possible to improve detection accuracy of the abnormal sound detection. Accordingly, it is possible to improve accuracy of classification determination such as an abnormality determination result of the sound data using the learning model based on the machine learning.

Third Embodiment

In a third embodiment, an example is shown in which the processing in the second embodiment is partially changed to generate a simulated abnormal sound in accordance with an abnormality type set based on a target sound data. Here, parts different from those of the second embodiment will be mainly described, and description of the same configurations and functions will be omitted.

Figure 12:
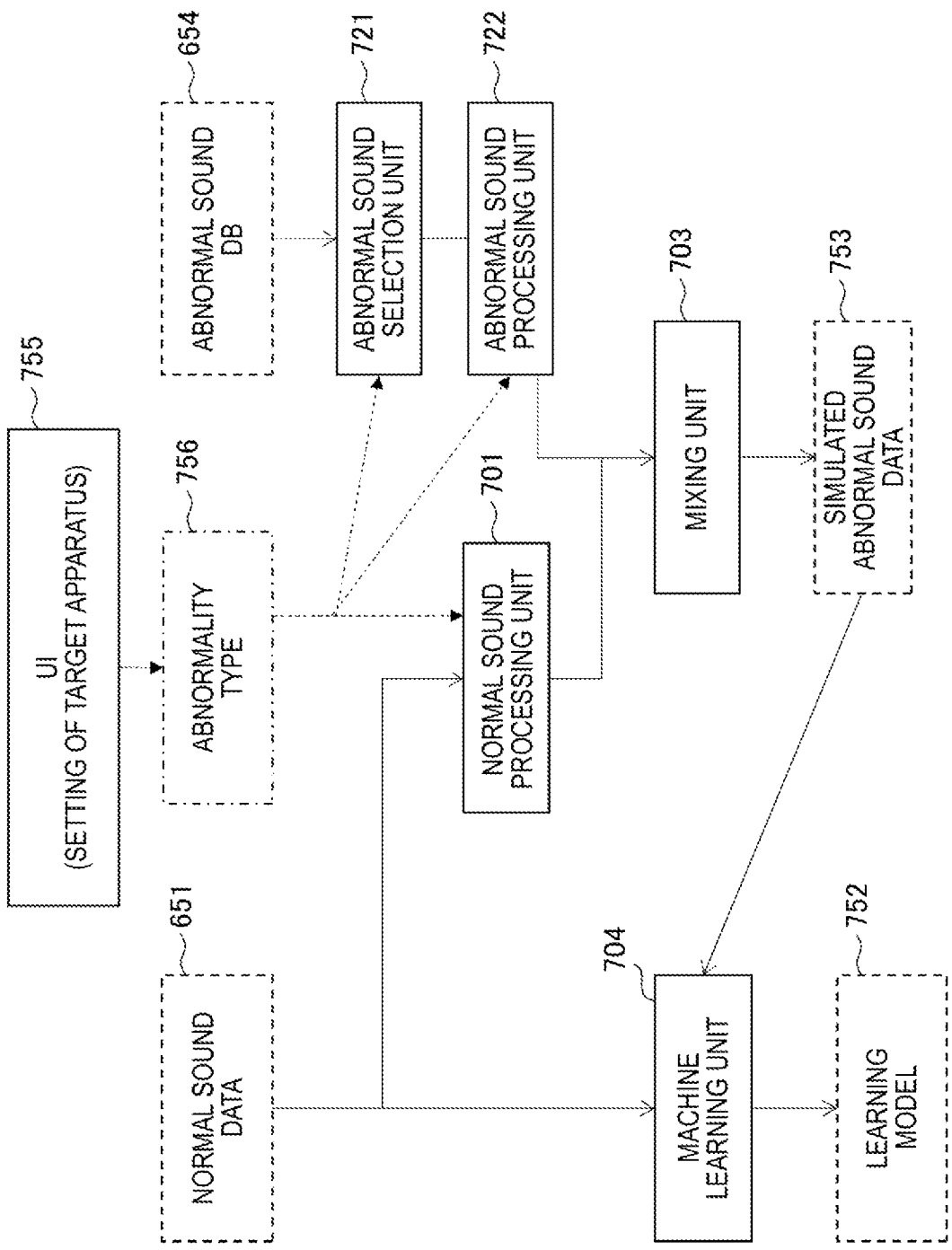
FIG. 12 is a block diagram showing a functional configuration during learning of a sound data processing device according to a third embodiment.

FIG. 12 is a block diagram showing a functional configuration during learning of a sound data processing device according to the third embodiment. The sound data processing device has functions of a normal sound processing unit 701, an abnormal sound selection unit 721, an abnormal sound processing unit 722, a mixing unit 703, and a machine learning unit 704 during machine learning. Here, the normal sound processing unit 701, the abnormal sound selection unit 721, the abnormal sound processing unit 722, and the mixing unit 703 implement a function as a simulated abnormal sound generation unit that generates simulated abnormal sound data 753. The normal sound processing unit 701, the abnormal sound selection unit 721, the abnormal sound processing unit 722, the mixing unit 703, and the machine learning unit 704 implement functions of the units by processings of the processing units 301 and 501 of the information processing devices 30 and 50.

The normal sound processing unit 701 uses the normal sound data 651 acquired as sound data of an inspection target (that is, a learning target) to perform a data processing for generating a simulated abnormal sound. The abnormal sound selection unit 721 uses the abnormal sound database (abnormal sound DB) 654 to select appropriate abnormal sound data in accordance with a type and features of the sound data of the inspection target. The abnormal sound processing unit 722 performs a data processing for generating a simulated abnormal sound by using the selected abnormal sound data. The mixing unit 703 performs a mixing processing of the processed normal sound data and the abnormal sound data, and generates the simulated abnormal sound data 753 that is sound data of simulated abnormal sound, so that augmentation of learning data is performed. As in the second embodiment, the machine learning unit 704 executes the machine learning such as deep learning by using artificial intelligence mounted on the processing units. The machine learning unit 704 performs a machine learning processing by using the acquired normal sound data 651 and the simulated abnormal sound data 753 generated based on the normal sound data and/or the abnormal sound data, and generates a learning model 752 as a learning result.

In the third embodiment, the sound data processing device sets an abnormality type 756 in accordance with a type of the sound data of the inspection target, and performs a different processing for each abnormality type to generate a simulated abnormal sound. The sound data processing device switches an operation of the normal sound processing unit 701, the abnormal sound selection unit 721, and the abnormal sound processing unit 722 in accordance with the set abnormality type 756. Depending on an abnormality type, a mode of an abnormal sound when an abnormality occurs with respect to a normal sound differs. Generally, the abnormality type is associated with the inspection target such as a target apparatus, a target object, and a target space. For example, there are features in sound characteristics when an abnormality occurs for each target apparatus such as an apparatus including a rotation body such as a motor or an apparatus including a driving mechanism such as a fan belt. In the following, as an example of a type of the sound data of the inspection target for which a generation processing of the simulated abnormal sound is performed, an example in which the abnormality type is set in accordance with a type of the target apparatus is shown.

The sound data processing device includes a display unit including a display device such as a liquid crystal display or an organic electro-luminescence (EL) display. The sound data processing device includes a user interface (UI) including a display screen and the like to be displayed on the display unit, and can accept selection input by a user operation. The sound data processing device uses the user interface (UI) 755 to accept the selection input of the target apparatus and set the abnormality type 756 in accordance with the target apparatus. The abnormality type 756 may be directly input and set by the user operation. Further, the sound data processing device may set the abnormality type 756 in accordance with the type and the features of the sound data of the inspection target based on identification information of sound data or the like.

The abnormality type 756 includes, for example, the following Cases 1 to 4.
  Case 1: an abnormal sound is mixed (a different sound is generated from a sound in a normal condition). Case 1 is an abnormality caused by, for example, a bearing abnormality of the rotation body, a fan belt abnormality, an abnormal contact of a drive system, or the like.
  Case 2: a peak frequency fluctuates (a peak frequency of a sound in a normal condition increases or decreases). Case 2 is an abnormality caused by, for example, a change in a rotation speed of the rotation body.
  Case 3: a peak frequency is lost (a peak frequency of a sound in a normal condition is lost). Case 3 is an abnormality caused by, for example, a change in a contact portion of the drive system.
  Case 4: a change in a volume (a level of a sound in a normal condition rises or falls). Case 4 is an abnormality caused by, for example, an increase or a decrease in friction of the rotation body or the drive system.

Figure 13:
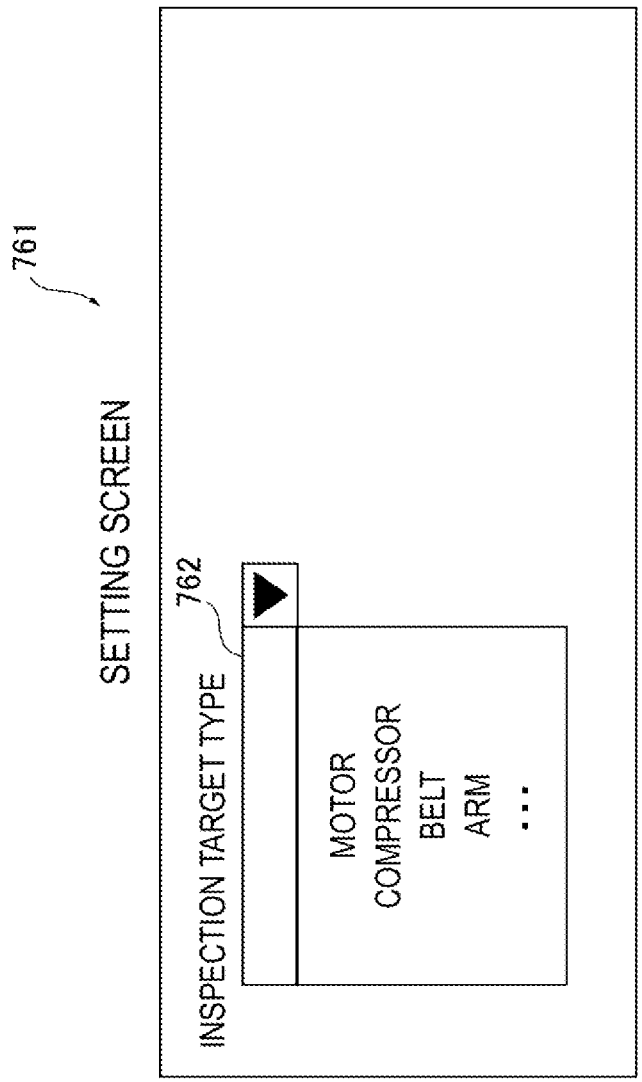
FIG. 13 is a diagram showing an example of a display screen of a user interface (UI) for selecting an inspection target.

FIG. 13 is a diagram showing an example of the display screen of the user interface (UI) for selecting an inspection target. A setting screen 761 on the display screen of the user interface is provided with a target setting input unit 762 for allowing a selection, a setting, and an input of a type of the target apparatus as the inspection target by the user operation. The target setting input unit 762 has, for example, a pull-down menu display on which names of inspection target types such as a motor, a compressor, a belt, and an arm are displayed in a list as target apparatuses. When a user selects and inputs a predetermined target apparatus in the target setting input unit 762, the sound data processing device sets the target apparatus of the inspection target and sets an abnormality type of a sound in accordance with the target apparatus. Such a user interface is used, so that it is possible to improve operability when setting an abnormality type or a target apparatus.

Figure 14:
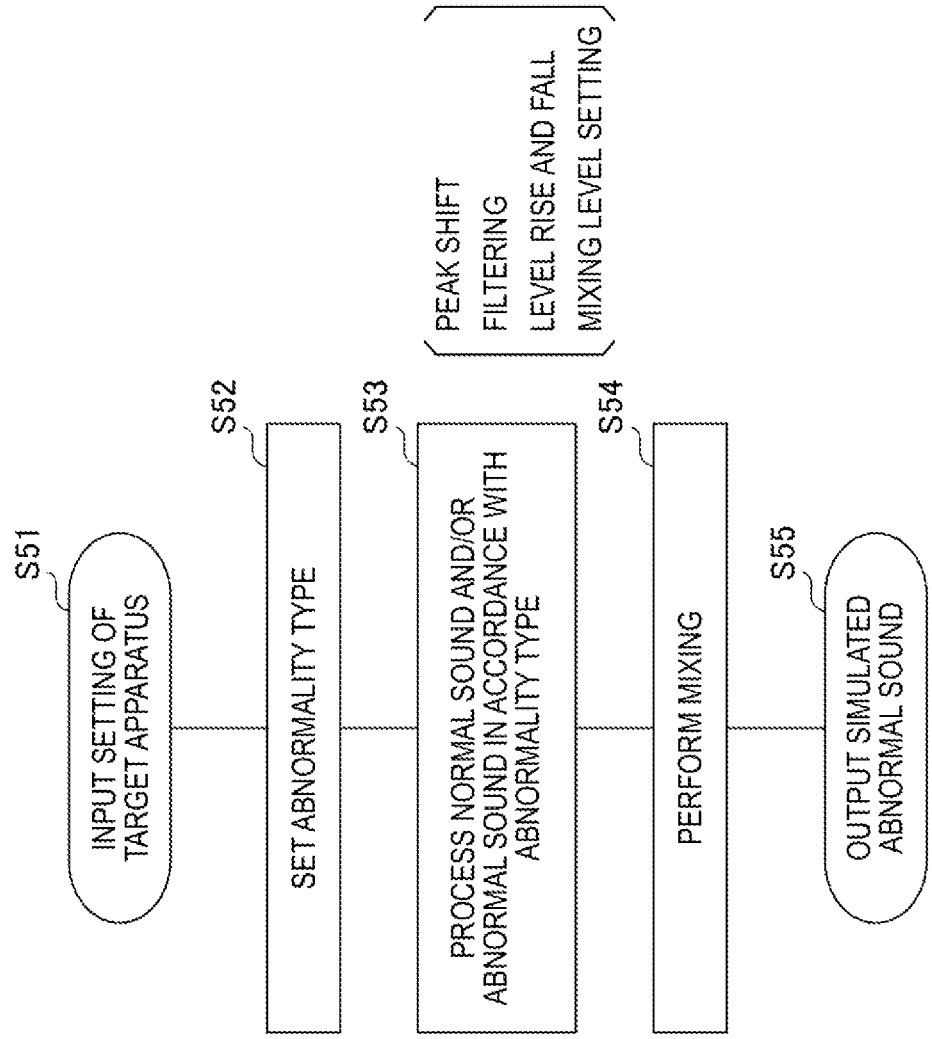
FIG. 14 is a flowchart showing a processing during learning of the sound data processing device according to the third embodiment.

FIG. 14 is a flowchart showing a processing during learning of the sound data processing device according to the third embodiment. The sound data processing device accepts an input of setting of a target apparatus by using the user interface 755 (S51), and sets the abnormality type 756 in accordance with the target apparatus (S52). Then, the sound data processing device switches an operation mode in accordance with the abnormality type 756 and executes at least one of processing of a normal sound and selection and processing of an abnormal sound, in the normal sound processing unit 701, the abnormal sound selection unit 721, and the abnormal sound processing unit 722 (S53). At this time, a peak shift, filtering, level rise and fall, mixing level setting, and the like are executed as a processing of the normal sound and/or the abnormal sound. A specific example of the processing in accordance with the abnormality type will be described later. Subsequently, the sound data processing device performs a mixing processing of the normal sound and the abnormal sound in the mixing unit 703 (S54), and generates and outputs the simulated abnormal sound data 753 (S55).

Figure 15B:
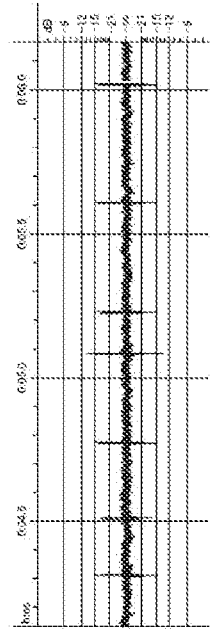
FIGS. 15A to 15D are diagrams illustrating a generation processing of a simulated abnormal sound in Case 1 of an abnormality type.
Figure 15A:
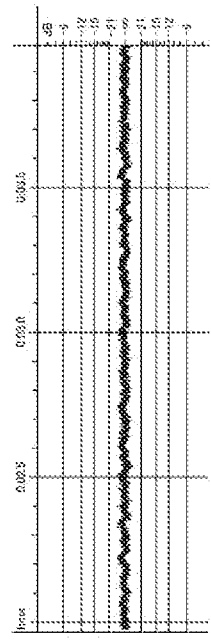
Figure 15D:
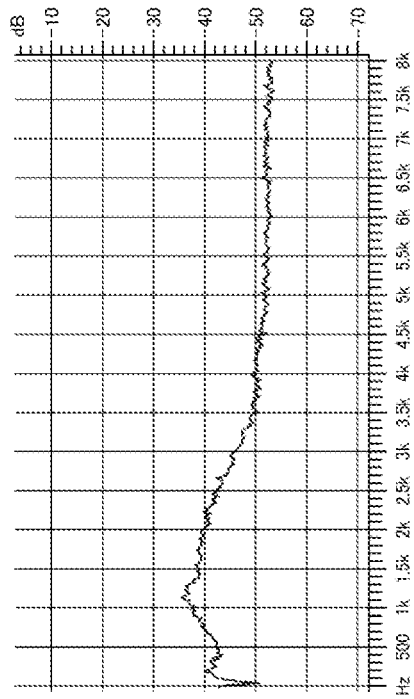
Figure 15C:
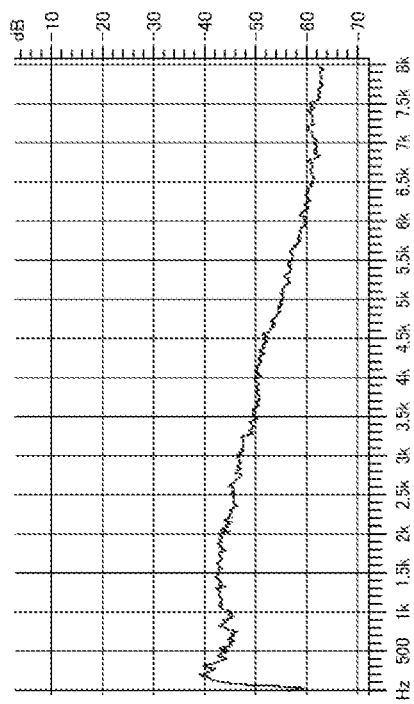

FIGS. 15A to 15D are diagrams illustrating a generation processing of a simulated abnormal sound in Case 1 of the abnormality type. FIG. 15A shows an example of a time waveform of a normal sound, and FIG. 15B shows an example of a time waveform of an abnormal sound, in which a horizontal axis represents time and a vertical axis represents a volume level. Further, FIG. 15C shows an example of a frequency characteristic of the normal sound at a predetermined time, and FIG. 15D shows an example of a frequency characteristic of the abnormal sound at a predetermined time, in which a horizontal axis represents a frequency and a vertical axis represents a signal level. In a case of Case 1, when the bearing abnormality, the fan belt abnormality, the abnormal contact of the drive system, or the like occurs, an abnormal sound is added to a normal sound. The illustrated example is an example in which a pulse-shaped sound is intermittently added to the normal sound, and in the frequency characteristic of the abnormal sound, the signal level rises in an entire band like white noise. There also may be a case where an abnormal sound component is added only to a predetermined frequency band (for example, around 1 kHz).

In Case 1, the abnormal sound selection unit 721, the abnormal sound processing unit 722, and the mixing unit 703 mainly operate, and execute a processing of adding the abnormal sound to the normal sound. In the sound data processing device, the abnormal sound selection unit 721 selects appropriate abnormal sound data from the abnormal sound database 654, and the abnormal sound processing unit 722 performs a processing of the selected abnormal sound data and sets a mixing level. As the processing of the abnormal sound data, a processing such as the peak shift is executed. Then, the mixing unit 703 mixes normal sound data and abnormal sound data in accordance with the mixing level set by the mixing unit 703, and outputs the simulated abnormal sound data 753. The normal sound processing unit 701 may appropriately perform a processing on the normal sound data and then mix the processed normal sound data with the abnormal sound data.

Figure 16A:
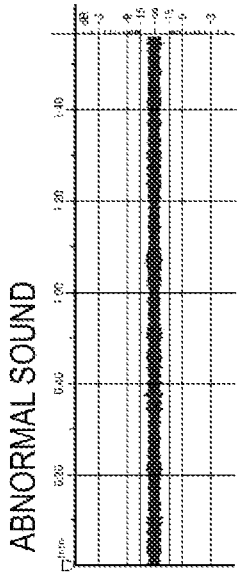
FIGS. 16A to 16D are diagrams illustrating a generation processing of a simulated abnormal sound in Case 2 of the abnormality type.
Figure 16B:
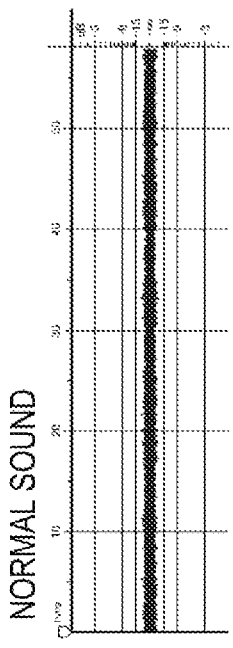
Figure 16C:
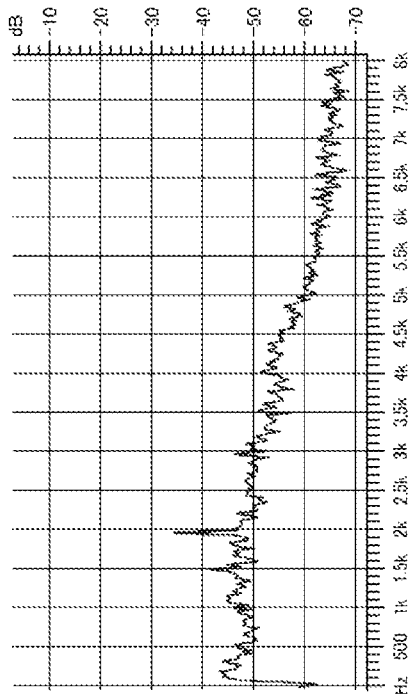
Figure 16D:
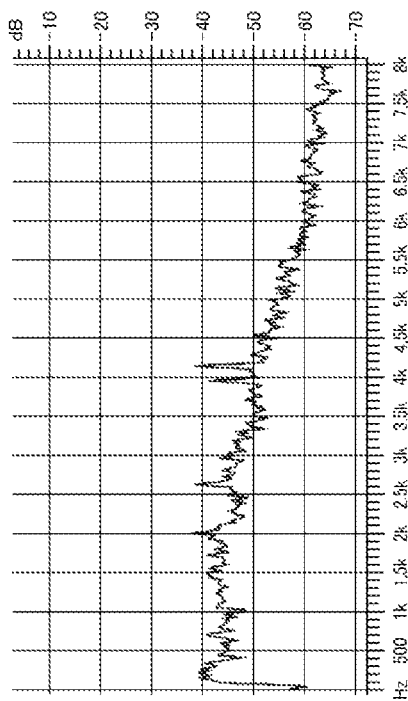

FIGS. 16A to 16D are diagrams illustrating a generation processing of a simulated abnormal sound in Case 2 of the abnormality type. FIG. 16A shows an example of a time waveform of a normal sound, and FIG. 16B shows an example of a time waveform of an abnormal sound, in which a horizontal axis represents time and a vertical axis represents a volume level. Further, FIG. 16C shows an example of a frequency characteristic of the normal sound at a predetermined time, and FIG. 16D shows an example of a frequency characteristic of the abnormal sound at a predetermined time, in which a horizontal axis represents a frequency and a vertical axis represents a signal level. In a case of Case 2, when a change in a rotation speed or the like occurs due to an abnormality of the rotation body such as the motor, a peak frequency of a sound fluctuates, and a band of a frequency component in which a peak occurs moves. In the illustrated example, in a state where there is a peak in a band of 4 kHz in the normal sound, a peak frequency fluctuates from 4 kHz to 2 kHz in the abnormal sound, a strong peak is generated in a band of 2 kHz, and a peak of 4 kHz disappears.

In Case 2, the normal sound processing unit 701 and the mixing unit 703 mainly operate, and execute a processing of performing a peak shift of the normal sound. In the sound data processing device, the normal sound processing unit 701 performs a processing of the normal sound data 651, causes a peak frequency of the normal sound data to fluctuate, and outputs the simulated abnormal sound data 753. In the mixing unit 703, the abnormal sound data may be mixed with the normal sound data after the peak shift.

Figure 17A:
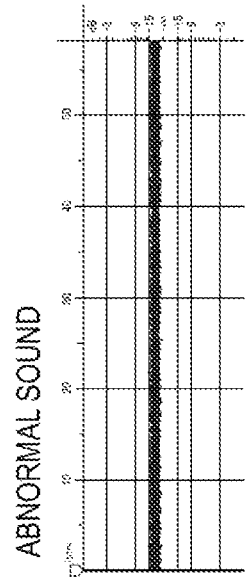
FIGS. 17A to 17D are diagrams illustrating a generation processing of a simulated abnormal sound in Case 3 of the abnormality type.
Figure 17B:
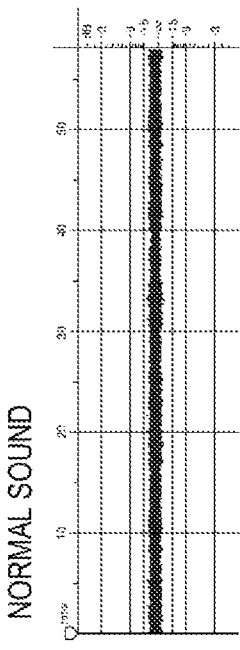
Figure 17C:
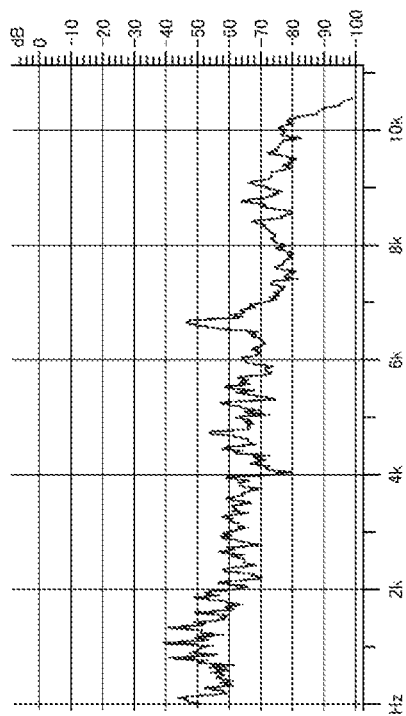
Figure 17D:
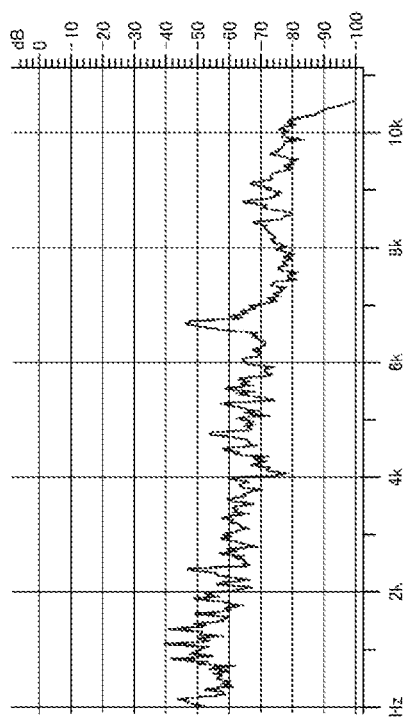

FIGS. 17A to 17D are diagrams illustrating a generation processing of a simulated abnormal sound in Case 3 of the abnormality type. FIG. 17A shows an example of a time waveform of a normal sound, and FIG. 17B shows an example of a time waveform of an abnormal sound, in which a horizontal axis represents time and a vertical axis represents a volume level. Further, FIG. 17C shows an example of a frequency characteristic of the normal sound at a predetermined time, and FIG. 17D shows an example of a frequency characteristic of the abnormal sound at a predetermined time, in which a horizontal axis represents a frequency and a vertical axis represents a signal level. In a case of Case 3, when a change in the contact portion of the drive system or the like occurs and a contact state is changed such that a specific portion is newly brought into contact or separated, a peak frequency of a sound is lost. In the illustrated example, in a state where there is a peak in a band around 2 kHz in the normal sound, there is no peak around 2 kHz in the abnormal sound.

In Case 3, the normal sound processing unit 701 and the mixing unit 703 mainly operate, and execute a processing of filtering the normal sound. In the sound data processing device, the normal sound processing unit 701 performs a processing of the normal sound data 651, attenuates a predetermined frequency of the normal sound data by a filter, and outputs the simulated abnormal sound data 753. The abnormal sound data may be mixed with the filtered normal sound data in the mixing unit 703.

In a case of Case 4, the volume level rises or falls and fluctuates when friction of the rotation body such as the motor or the drive system such as the fan belt or a gear increases or decreases, or the like. For example, the friction fluctuates due to lack or excess of grease injected between members, and a volume of a sound of a target apparatus increases or decreases.

In Case 4, the normal sound processing unit 701 and the mixing unit 703 mainly operate and execute a processing of increasing or decreasing a level of the normal sound. In the sound data processing device, the normal sound processing unit 701 performs a processing of the normal sound data 651, increases or decreases a volume level of the normal sound data by changing a filter gain, and outputs the simulated abnormal sound data 753. In the mixing unit 703, the abnormal sound data may be mixed with the normal sound data after the level adjustment.

As described above, in the present embodiment, each abnormality type is set, which differs depending on a type of a target apparatus or the like to be subjected to the machine learning of the sound data, and each processing is performed in accordance with the abnormality type to generate the simulated abnormal sound. Accordingly, it is possible to generate a simulated abnormal sound in an abnormal state having different characteristics for each abnormality type, and it is possible to generate appropriate simulated abnormal sound data in accordance with each mode of the abnormality type.

Fourth Embodiment

As a fourth embodiment, a functional configuration having a mode in which at least two of the above-described first embodiment, second embodiment, and third embodiment are combined can be adopted. In the fourth embodiment, for example, in an environment in which only a target normal sound can be acquired, sound data of a simulated abnormal sound is generated by the functional block of the second embodiment shown in FIG. 7, sound data of a similar sound is further generated by the functional block of the first embodiment shown in FIG. 2 based on learning sound data including the simulated abnormal sound, and machine learning is performed using learning sound data including the simulated abnormal sound and the similar sound. In this way, the simulated abnormal sound and the similar sound are generated to perform augmentation of the learning sound data, machine learning using a large amount of learning data is enabled, and more accurate abnormal sound detection can be executed.

Further, as a modification, after the machine learning in accordance with the functional configuration of any one of the first, second, third, and fourth embodiments is once executed, additional learning is executed by adding the learning sound data, and a more optimized learning model can also be generated. For example, when an actual abnormal sound can be acquired after the machine learning is performed by generating a simulated abnormal sound by the functional block of the second embodiment, additional learning using the acquired abnormal sound, additional learning in which a similar abnormal sound is generated and used as in the first embodiment, and the like are executed. Alternatively, after the machine learning is performed by generating a similar sound by the functional block of the first embodiment, additional learning using the additionally acquired normal sound or abnormal sound, additional learning based on data added by the generation of the simulated abnormal sound of the second embodiment or the generation of the similar sounds of the first embodiment, and the like are executed.

In this way, by combining augmentation processings of a plurality of types of learning data, it is possible to generate a learning model using more appropriate learning data. Further, by combining additional learning based on the further acquired learning data, it is possible to generate a learning model using more appropriate learning data. Therefore, it is possible to improve accuracy of classification determination such as abnormality determination result of sound data using a learning model based on the machine learning.

As described above, the sound data processing method according to the present embodiment is a sound data processing method of the sound data processing device including the information processing devices 30 and 50 that include the processing units 301 and 501 that acquire target sound data by input and process the sound data, and includes: in the similar environment generation unit 201, a step of generating the similar sound data 253 that is a similar sound similar to the target sound data 251 based on the acquired target sound data 251; and in the machine learning unit 202, a step of performing machine learning by using the acquired target sound data 251 and the generated similar sound data 253 as learning sound data, and of generating the learning model 252 for performing classification determination related to the target sound data. Accordingly, even when a large amount of learning data cannot be acquired, by generating and using the similar sound data, a suitable learning model for the machine learning can be generated using a sufficient amount of appropriate learning data. Further, an operation of classification determination such as abnormal sound determination can be executed by a learning model generated using a sufficient amount of learning data, and accuracy of classification determination related to the target sound data can be improved.

Further, in the sound data processing method according to the present embodiment, in the step of generating the similar sound data, a similar environment of the target sound data 251 is generated, and a plurality of pieces of similar sound data 253 are generated by changing at least one of the frequency characteristic and the volume of the target sound data 251. Accordingly, the plurality of pieces of similar sound data similar to the target sound data can be generated based on the target sound data acquired in a real environment. Further, by using the similar sound data from the similar environment as the learning data, it is also possible to cope with an environmental change during an operation, and it is possible to improve the accuracy of the classification determination related to the target sound data.

Further, in the sound data processing method according to the present embodiment, in the step of generating the similar sound data, the similar sound data 253 is generated using the filter that changes the frequency characteristic of the target sound data 251. Accordingly, the similar sound data related to the target sound data can be generated by changing the frequency characteristic of the target sound data.

Further, in the sound data processing method according to the present embodiment, in the step of generating the similar sound data, the similar sound data 253 is generated using the volume change parameter for changing the volume of the entire frequency band or the volume of a specific frequency band of the target sound data 251. Accordingly, the similar sound data related to the target sound data can be generated by changing the volume of the entire frequency band or the volume of a specific frequency band of the target sound data.

Further, in the sound data processing method according to the present embodiment, in the step of generating the similar sound data, data in which a learning contradiction occurs in the machine learning is discarded for the plurality of generated pieces of similar sound data 253. Accordingly, it is possible to remove data in which a learning contradiction occurs, such as sound data having the same frequency among sound data having different labels, and it is possible to execute appropriate machine learning.

Further, in the sound data processing method according to the present embodiment, in the step of generating the learning model, the learning model 252 for determining the abnormal sound of the target sound data to perform the abnormal sound detection is generated as the classification determination related to the target sound data. Accordingly, the machine learning is performed using a sufficient amount of appropriate learning data including the target sound data acquired in the real environment and the automatically generated similar sound data, and a learning model corresponding to the abnormal sound detection based on an abnormal sound determination result can be generated.

Further, in the sound data processing method according to the present embodiment, in the step of generating the learning model, the machine learning is performed using, as the learning sound data, the general-purpose sound database 254 in which general-purpose sound data including a general-purpose sound is accumulated, together with the target sound data 251 and the similar sound data 253. Accordingly, it is possible to perform the machine learning by using a sufficient amount of appropriate learning data including the general-purpose sound data, to generate a more preferable learning model, and to improve the accuracy of the classification determination related to the target sound data.

The sound data processing device according to the present embodiment is a sound data processing device including the information processing devices 30 and 50 that include the processing units 301 and 501 that acquire target sound data by input and process the sound data, in which the processing units 301 and 501 include: the similar environment generation unit 201 that generates the similar sound data 253 that is a similar sound similar to the target sound data 251 based on the acquired target sound data 251; and the machine learning unit 202 that performs the machine learning by using the acquired target sound data 251 and the generated similar sound data 253 as the learning sound data and that generates the learning model 252 for performing the classification determination related to the target sound data. Accordingly, even when a large amount of learning data cannot be acquired, a suitable learning model for the machine learning can be generated using a sufficient amount of appropriate learning data, and the accuracy of the classification determination related to the target sound data can be improved.

The program according to the present embodiment is a program for causing the sound data processing device including the information processing devices 30 and 50, which are computers, to execute: a step of acquiring target sound data; a step of generating the similar sound data 253 that is a similar sound similar to the target sound data 251 based on the acquired target sound data 251; and a step of performing the machine learning by using the acquired target sound data 251 and the generated similar sound data 253 as the learning sound data, and of generating the learning model 252 for performing the classification determination related to the target sound data.

The sound data processing method according to the present embodiment is a sound data processing method of the sound data processing device including the information processing devices 30 and 50 that include the processing units 301 and 501 that acquire target sound data by input and process the sound data, and includes: a step of generating the simulated abnormal sound data 653 that is a simulated abnormal sound of a target by using the acquired normal sound data 651 of the target; and a step of performing the machine learning by using the acquired normal sound data 651 and the generated simulated abnormal sound data 653 as the learning sound data, and of generating the learning model 652 for determining an abnormal sound of the target sound data to perform the abnormal sound detection. Accordingly, even when actual learning data at the time of an abnormality cannot be acquired, by generating and using the simulated abnormal sound data, it is possible to generate a suitable learning model for the machine learning by using a sufficient amount of appropriate learning data. Further, an operation of abnormal sound determination can be executed by a learning model generated by machine learning including sound data of a simulated abnormal sound, and accuracy of abnormal sound detection related to the target sound data can be improved.

Further, in the sound data processing method according to the present embodiment, in the step of generating the simulated abnormal sound data, the normal sound processing units 601 and 701 execute a data processing of the normal sound data 651. Accordingly, it is possible to generate the simulated abnormal sound data by processing the acquired normal sound data.

Further, in the sound data processing method according to the present embodiment, at least one processing of the peak shift, the filtering, and the volume change of the normal sound data is executed as the data processing. Accordingly, it is possible to generate simulated abnormal sound data corresponding to abnormal states such as a fluctuation in a peak frequency of the normal sound, a loss in a peak frequency, and a change in a volume.

Further, in the sound data processing method according to the present embodiment, in the step of generating the simulated abnormal sound data, the mixing unit 603 performs the mixing processing of the normal sound data and the abnormal sound data by using the normal sound data 651 and the abnormal sound data selected from the abnormal sound database 654 held in advance to generate the simulated abnormal sound data 653. Accordingly, the normal sound data acquired in the real environment and the abnormal sound data prepared in advance are added or the like to be subjected to the mixing processing, and the simulated abnormal sound data can be generated.

Further, in the sound data processing method according to the present embodiment, in the step of generating the simulated abnormal sound data, the normal sound processing unit 601 executes the data processing on at least one of the normal sound data and the abnormal sound data for performing the mixing processing by the mixing unit 603. Accordingly, the normal sound data acquired in the real environment is processed, and sound data for mixing for generating the simulated abnormal sound data can be generated.

Further, in the sound data processing method according to the present embodiment, in the data processing, at least one processing of removal of a specific frequency and a frequency movement of the normal sound data 651 is performed using the filter. Accordingly, the frequency characteristic of the normal sound data can be changed and processed, so that the simulated abnormal sound data can be generated, or data for mixing during generation of the simulated abnormal sound data can be generated.

Further, in the sound data processing method according to the present embodiment, in the step of generating the simulated abnormal sound data, the abnormality type 756 is set, a processing using only the normal sound data or the normal sound data and the abnormal sound data is performed in accordance with the abnormality type 756, and the simulated abnormal sound data is generated. At this time, the abnormality type 756 may be set based on a type of the target sound data. Accordingly, it is possible to generate a simulated abnormal sound in an abnormal state for each abnormality type and generate appropriate simulated abnormal sound data in accordance with each mode of the abnormality type.

Further, in the sound data processing method according to the present embodiment, in the step of generating the simulated abnormal sound data, the abnormal sound selection unit 602 executes the selection processing of the abnormal sound data from the abnormal sound database 654 for performing the mixing processing by the mixing unit 603. Accordingly, it is possible to generate the sound data for mixing for generating the simulated abnormal sound data from the abnormal sound database accumulated in advance.

Further, in the sound data processing method according to the present embodiment, in the selection processing, suitable abnormal sound data is selected from the abnormal sound database 654 based on a type of the target sound data. Accordingly, the abnormal sound data can be selected based on the type of the target sound data, and appropriate sound data for mixing for generating the simulated abnormal sound data can be extracted.

Further, in the sound data processing method according to the present embodiment, in the selection processing, it is determined whether the abnormal sound database 654 is used in accordance with the characteristics of the target sound data, and when the abnormal sound database 654 is not used, the silent sound data is output. Accordingly, when the simulated abnormal sound data is generated by the processed normal sound data without using the abnormal sound database, it is possible to generate appropriate simulated abnormal sound data by outputting the silent sound data as the abnormal sound data for mixing.

The sound data processing device according to the present embodiment is a sound data processing device including the information processing devices 30 and 50 that include the processing units 301 and 501 that acquire target sound data by input and process the sound data, in which the processing units 301 and 501 include: the simulated abnormal sound generation unit (the normal sound processing unit 601, the abnormal sound selection unit 602, the mixing unit 603) that generates the simulated abnormal sound data 653 that is a simulated abnormal sound of a target by using the acquired normal sound data 651 of the target; and the machine learning unit 604 that performs the machine learning by using the acquired normal sound data 651 and the generated simulated abnormal sound data 653 as the learning sound data, and that generates the learning model 652 for determining an abnormal sound of the target sound data to perform the abnormal sound detection. Accordingly, even when actual learning data at the time of an abnormality cannot be acquired, a suitable learning model for the machine learning can be generated using a sufficient amount of appropriate learning data, and accuracy of the abnormality detection related to the target sound data can be improved.

The program according to the present embodiment is a program for causing the sound data processing device including the information processing devices 30 and 50, which are computers, to execute: a step of acquiring target sound data; a step of generating the simulated abnormal sound data 653 that is a simulated abnormal sound of a target by using the acquired normal sound data 651 of the target; and a step of performing the machine learning by using the acquired normal sound data 651 and the generated simulated abnormal sound data 653 as the learning sound data, and of generating the learning model 652 for determining an abnormal sound of the target sound data to perform the abnormal sound detection.

Although various embodiments are described above with reference to the drawings, it is needless to say that the present invention is not limited thereto. It will be apparent to those skilled in the art that various changes and modifications may be conceived within the scope of the claims. It is also understood that the various changes and modifications belong to the technical scope of the present invention. Further, constituent elements in the embodiments described above may be combined freely within a range not departing from the spirit of the present invention.

In the present disclosure, a program for implementing the sound data processing method and the function of the sound data processing device according to the above-described embodiments may be supplied to an information processing device that is a computer via a network or various memory media, and the program read and executed by a processor of the information processing device and a recording medium in which the program is memorized may also be set as an application range.

The present application is based on Japanese patent applications filed on Jul. 31, 2018 (Japanese Patent Application No. 2018-144436 and Japanese Patent Application No. 2018-144437), and the contents thereof are incorporated herein by reference.

INDUSTRIAL APPLICABILITY

The present disclosure is useful as a sound data processing method, a sound data processing device, and a program that enable generation of a suitable learning model by using appropriate learning data when performing machine learning of data.

REFERENCE SIGNS LIST

10: microphone
20: AD converter
30: information processing device (terminal device)
40: communication path
50: information processing device (server device)
201: similar environment generation unit
202, 604: machine learning unit
251: target sound data
252, 452, 652: learning model
253: similar sound data
254: general-purpose sound database
301, 501: processing unit
302, 502: memory unit
303, 503: storage unit
304, 504: communication interface
401: determination unit
451: inspection sound data
453: determination result
454: abnormality determination result
601: normal sound processing unit
602: abnormal sound selection unit
603: mixing unit
651: normal sound data
653: simulated abnormal sound data
654: abnormal sound database

The invention claimed is:

1. A data processing method comprising:
acquiring data of a target by input;
generating similar data that is similar to the data of the target, based on the data of the target; and
performing machine learning by using the acquired data of the target and the generated similar data as learning data, and generating a learning model for performing classification determination related to the data of the target.

2. The data processing method according to claim 1, wherein the generating the similar data comprises generating a similar environment of the data of the target, and changing at least one of a frequency characteristic and a volume of the data of the target to generate a plurality of pieces of similar data.

3. The data processing method according to claim 2, wherein the similar data is generated by using a filter configured to change a frequency characteristic of the data of the target.

4. The data processing method according to claim 2, wherein the similar data is generated by using a volume change parameter for changing a volume of an entire frequency band or a volume of a specific frequency band of the data of the target.

5. The data processing method according to claim 2, wherein the generating the similar data comprises discarding data in which a learning contradiction occurs in the machine learning for the plurality of generated pieces of similar data.

6. The data processing method according to claim 1, wherein the learning model comprises a learning model for determining, as the classification determination related to the data of the target, an abnormity of the target of the data of the target to perform abnormal detection.

7. The data processing method according to claim 1, wherein the machine learning is performed using, as the learning data, a general-purpose database in which general-purpose data including a general-purpose target is accumulated, together with the data of the target and the similar data.

8. A data processing device comprising:
a processor; and
a memory having instructions that, when executed by the processor, cause the data processing device to perform operations comprising:
acquiring data of a target;
generating similar data that is similar to the data of the target, based on acquired data of the target; and
performing machine learning by using the acquired data of the target and the generated similar data as learning data, and generating a learning model for performing classification determination related to the data of the target.

9. A non-transitory computer-readable medium storing a program that, when executed by a processor, causes a data processing device, which is a computer, to execute operations comprising:
acquiring data of a target;
generating similar data that is similar to the data of the target, based on acquired data of the target; and
performing machine learning by using the acquired data of the target and the generated similar data as learning data, and generating a learning model for performing classification determination related to the data of the target.

* * * * *